US011537850B2

(12) United States Patent
Hart

(10) Patent No.: US 11,537,850 B2
(45) Date of Patent: *Dec. 27, 2022

(54) SYSTEMS AND METHODS FOR SIMULATING SENSE DATA AND CREATING PERCEPTIONS

(71) Applicant: Mind Machine Learning, Inc., San Jose, CA (US)

(72) Inventor: Brian Joseph Hart, San Jose, CA (US)

(73) Assignee: MIND MACHINE LEARNING, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/103,921

(22) Filed: Nov. 24, 2020

(65) Prior Publication Data

US 2021/0081764 A1    Mar. 18, 2021

Related U.S. Application Data

(63) Continuation of application No. 16/997,867, filed on Aug. 19, 2020.
(Continued)

(51) Int. Cl.
*G06N 20/00* (2019.01)
*G06N 3/04* (2006.01)
(Continued)

(52) U.S. Cl.
CPC ............ *G06N 3/0454* (2013.01); *G06F 9/547* (2013.01); *G06N 3/082* (2013.01); *G06N 20/00* (2019.01)

(58) Field of Classification Search
CPC ....... G06N 3/082; G06N 3/0454; G06N 20/10
(Continued)

(56) References Cited

U.S. PATENT DOCUMENTS 8,990,133 B1   3/2015   Ponullak et al.
9,053,431 B1   6/2015   Commons
(Continued)

FOREIGN PATENT DOCUMENTS

WO   WO2015/192117 A1   12/2015
WO   WO2017/177128 A1   10/2017

OTHER PUBLICATIONS

The Influence of Textile Materials Mechanical Properties upon Virtual Garment Fit (Year: 2011).*
(Continued)

*Primary Examiner* — Omar F Fernandez Rivas
*Assistant Examiner* — Shamcy Alghazzy
(74) *Attorney, Agent, or Firm* — Morgan, Lewis & Bockius LLP

(57) ABSTRACT

A method includes defining a first virtual being (e.g., including sensory locations for sensors, sense locations for sense properties, artificial neural networks connecting sensors to sense properties) in a virtual environment. The method also includes defining an object (e.g., including sense locations) in the virtual environment. The method also includes, in accordance with an interaction between the virtual being and the object, receiving sensory input at a first sensor at a first sensory location using a first virtual medium according to a first sense property of the object at a first sense location. The first sensor, the first virtual medium, and the first sense property have a same sensory type. According to the received sensory input, a first artificial neural network translates the received sensory input into updates to one or more configuration parameters of sensors of the first virtual being or movement of the virtual being.

30 Claims, 12 Drawing Sheets

Related U.S. Application Data

(60) Provisional application No. 62/889,063, filed on Aug. 20, 2019.

(51) Int. Cl.
  *G06F 9/54* (2006.01)
  *G06N 3/08* (2006.01)

(58) Field of Classification Search
  USPC .......................................................... 706/15
  See application file for complete search history.

(56) References Cited

U.S. PATENT DOCUMENTS

| | | | | |
|---|---|---|---|---|
| 9,215,293 | B2* | 12/2015 | Miller | G06F 3/011 |
| 9,443,192 | B1 | 9/2016 | Cosic | |
| 2008/0294400 | A1* | 11/2008 | Czora | G06N 3/02 |
| | | | | 703/6 |
| 2013/0066568 | A1* | 3/2013 | Alonso | G01M 3/243 |
| | | | | 702/51 |
| 2013/0098309 | A1* | 4/2013 | Nohara | A01M 29/18 |
| | | | | 119/713 |
| 2013/0235034 | A1 | 9/2013 | Reitan | |
| 2013/0237272 | A1* | 9/2013 | Prasad | H01Q 1/245 |
| | | | | 342/372 |
| 2014/0305716 | A1* | 10/2014 | Kong | B25J 9/161 |
| | | | | 901/1 |
| 2016/0025615 | A1* | 1/2016 | Fishel | G01N 19/00 |
| | | | | 702/33 |
| 2017/0059860 | A1* | 3/2017 | Alsheuski | G02B 23/04 |
| 2017/0213473 | A1* | 7/2017 | Ribeira | G09B 5/10 |
| 2019/0096113 | A1* | 3/2019 | Stukalov | G06T 11/60 |
| 2020/0210127 | A1* | 7/2020 | Browy | G06F 3/012 |
| 2020/0234481 | A1* | 7/2020 | Scapel | A63F 13/213 |

OTHER PUBLICATIONS

Real-time deformation of structure using finite element and neural networks in virtual reality applications (Year: 2006).*

Hambli—Real-time deformation of structure using finite element and neural networks in virtual reality applications (Year: 2006).*

Anonymous, Depth of Field in SceneKit, May 1, 2015, 3 pgs., downloaded from http://flexmonkey.blogspot.com/201S/05/depth-of-field-in-scenekit.htmlhttps://urldefense.com/v3/_https:/www.youtube.com/watch?v=Rzj3k3yerDk_;!!DuJIhUBmA6S-!VgcpSSse_YbYxgBz7DHUCfVduWdNLYKWrWNPXjN4yaxgUIC4iIppn7ADqwX1TsN9XD1KmQ$.

https://urldefense.com/v3/_https:/www.youtube.com/watch?v=Rzj3k3yerDk_;!!DuJIhUBmA6S-!VgcpSSse_VbYxgBz7DHUCfVduWdNLYKWrWNPXjN4yaxgUIC4iIppn7ADqwX1TsN9XD1KmQ$Apple, SceneKit, Apple Developer, 2 pgs., can be accessed from https://developer.apple.com/scenekit.

Dorrier et al., DeepMind's Newest AI Programs Itself to Make All the Right Decision, Jul. 26, 2020, downloaded from https://singularityhub.com/2020/07/26/deepminds-newest-ai-programs-itself-to-make-all-the-right-decisions/, 6 pgs.

Erroll Wood, Synthetic Data with Digital Humans, Microsoft, Cambridge, UK, 20 pgs., downloaded from https://www.microsoft.com/en-us/research/uploads/prod/2019/09/2019-10-01-Synthetic-Data-with-Digital-Humans.pdf.

Fei, A Multi-Scale Model for Simulating Liquid-Hair Interactions, ACM Transactions on Graphics, vol. 36, No. 4, Article 56, Jul. 2017, 17 pgs., downloaded from http://www.cs.columbia.edu/cg/liquidhair/.

Galda, Introducing Maya, 2020, the Maya Blog, Area by Autodesk, Dec. 10, 2019, 10 pgs., downloaded from https://area.autodesk.com/blogs/the-maya-blog/introducing-maya-2020/.

Immersive Limit, Simple Character Controller for Unity, Jan. 22, 2021, 21 pgs., downloaded from https://www.immersivelimit.com.

Kalle Bladin, Soft Body Maya Deformer Using Shape Matching, TNCG13 SFX—Tricks of the Trade: Project Report, Dec. 17, 2015, 5 pgs., downloaded from http://kbladin.se/dmt_projects/shape_match.php.

Macula, ear anatomy, Encyclopedia Britannica, 1997, 2 pgs., downloaded from https://www.britannica.com/science/macula.

Maya Software, Computer Animation & Modeling Software, Autodesk, 10 pgs., can be access from https://www.autodesk.com/products/maya/overview.

Microsoft Joins the Blender Development Fund, Blender, Press Releases Jul. 29, 2020, 4 pgs., downloaded from https://www.blender.org/press/microsoft-joins-the-blender-development-fund/.

Pathak, Curiosity-Driven Exploration by Self-supervised Prediction, Proceedings of the 34th International Conference on Machine Learning, Sydney, Australia, 2017, downloaded from https://pathak22.github.io/noreward-rl, 12 pgs.

Puche-Diaz, Testing Pupil & Iris Rig., Rigging Artist at Skydance Animation Madrid, People, Linkedin, 2 pgs., can be access from https://www.linkedin.com/posts/jos%C3%A9-miguel-puche-d%C3%ADaz-b1a4779a_rig-characterigging-python-ugcPost-6689235472906039296-flXZ.

Sebastian Starke, Local Motion Phases for Learning Multi-Contact Character Movements, Jun. 9, 2020, 1 pg., YouTube video can be access from https://www.youtube.com/watch?v=Rzj3k3yerDk.

Unity.co, Industrial, Unity Simulation, 14 pgs., can be access from https://unity.com/products/unity-simulation.

Vernon et al., A Roadmap for Cognitive Development in Humanoid Robots, Springer, Cognitive Systems Monographs, vol. 11, ISBN 978-3-642-16903-8, © 2010 Springer-Verlag Berlin Heidelberg, 116 pgs.

Zakaton/Pink-Trombone, A programmable version of Neil Thapen's Pink Trombone, Feb. 6, 2020, 13 pgs., downloaded from https://github.com/zakaton/Pink-Trombone.

Mind Machine Learning, Inc., International Search Report and Written-Opinion, PCTUS2020047240, dated Nov. 9, 2020, 12 pgs.

* cited by examiner

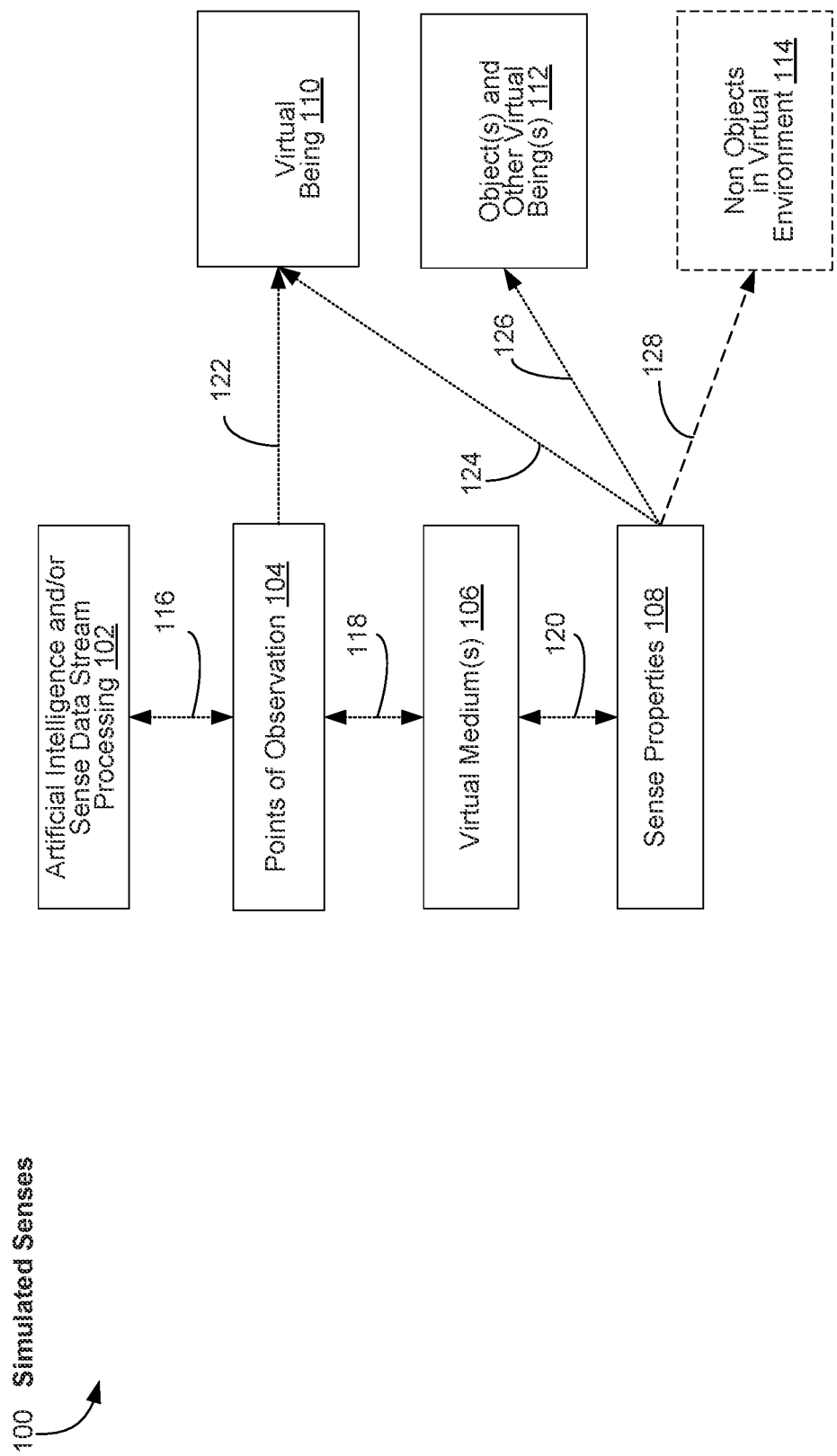

SYSTEMS AND METHODS FOR SIMULATING SENSE DATA AND CREATING PERCEPTIONS

RELATED APPLICATIONS

This application is a continuation of U.S. patent application Ser. No. 16/997,867, filed Aug. 19, 2020, entitled "Systems and Methods for Simulating Sense Data and Creating Perceptions," which claims priority to U.S. Provisional Patent Application No. 62/889,063, filed Aug. 20, 2019, entitled "Method of simulating sense data and creating perceptions using an enhanced virtual body and enhanced virtual environment," each of which is incorporated by reference in its entirety.

TECHNICAL FIELD

The disclosed implementations relate generally to virtual reality and more specifically to simulating sense data and creating perceptions.

BACKGROUND

Conventional automatons rely on real-world sensory data for generating responses. Such machines are capable of acting independently, but are reactive and lack awareness. For example, robots and semi-autonomous or autonomous vehicles use sensory data from cameras, microphones, satellite-based radio, Lidar, and other electronic sensors and systems, for navigation. Some robots use cameras and microphones to interact with people, and use mechanical actuators to create facial expressions. Reaction alone is not awareness, as it involves no perception, only a measurement and an instruction. For example, a robot arm with a heat sensor may have an instruction to retract the arm when the temperature read by the sensor is above a certain temperature.

State-of-the-art robots and autonomous systems that incorporate advanced artificial intelligence (AI) algorithms lack experiences and associated capabilities. For example, an AI system lacks mastery over language, because quality of such language capabilities is correlated with richness of experience. To have a rich set of experiences across a spectrum requires such AI-based systems to have a body with a large set of senses and an environment that closely approximates the real world. However, inserting the AI into a mammal body is impractical.

SUMMARY

Accordingly, there is a need for simulating senses in a virtual body in a virtual environment, to create perceptions. Systems, devices, and methods described herein may be used to simulate (or approximate) sense data and create perceptions using an enhanced virtual body and enhanced virtual environment. Some implementations use fundamental quality representation and recreation algorithms (FQRRs), a model of pain and/or pleasure, and apply machine learning algorithms as an AI brain for the enhanced virtual body. In some implementations, the AI brain utilizes one or more machine learning libraries and frameworks (e.g., Google's TensorFlow or similar machine learning or AI frameworks provided by AWS, Google's Machine Learning (ML) Kit, Microsoft Azure AI, OpenAI API, Apple Core ML, PyTorch).

In accordance with some implementations, a method is provided for simulating sense data for virtual beings in virtual environments. The method is performed at a computer system having one or more processors, memory, and one or more programs stored in the memory and configured for execution by the one or more processors. The one or more programs instructions for performing the method. The method includes defining a first virtual being in a virtual environment. The first virtual being includes a plurality of sensory locations. Each sensory location has one or more sensors. Each sensor has a respective sensory type and is configured to receive sensory input by one or more respective virtual mediums having the respective sensory type. The first virtual being also includes a plurality of sense locations, each sense location storing a respective set of one or more sense properties, each sense property having a respective sensory type. The first virtual being also includes a plurality of artificial neural networks connecting sensors at the plurality of sensory locations. The method also includes defining an object in the virtual environment. The object has a plurality of sense locations, each sense location storing a respective set of one or more sense properties, each sense property having a respective sensory type. The method also includes, in accordance with an interaction between the virtual being and the object, receiving sensory input at a first sensor at a first sensory location using a first virtual medium according to a first sense property of the object at a first sense location. The first sensor, the first virtual medium, and the first sense property have a same sensory type. The method also includes, in accordance with the received sensory input, using a first artificial neural network to translate the received sensory input into updates to one or more configuration parameters of sensors of the first virtual being or movement of the virtual being. The artificial neural network or the virtual medium or combination can update the configuration parameters (e.g. resolution or pruning of sensors when their resolution or max resolution goes to 0 in for some sensory types where it is a permanent pain effect that we want. The artificial neural network also can also be responsible for actuating the movement of the being.

In some implementations, the method further includes: selecting enhancements or impairments to apply to the first sensory location and/or the first artificial neural network based on (i) the first sensory location and the first sense location, and (ii) the sensory type of the first sensor, the first virtual medium, and the first sense property; and altering, based on the enhancements or impairments, (i) one or more configuration parameters of the first sensor, thereby modifying its ability to receive sensory input, and/or (ii) one or more configuration parameters of the first artificial neural network, thereby modifying its ability to process sense properties.

In some implementations, in accordance with a determination that the sensory type is light touch, selecting the enhancements or impairments is further based on determining whether the first sensory location is deformed by a predetermined amount in a direction normal to the first sensory location's non-deformed baseline location, within a predetermined time period. Note that "light touch" is a label that identifies a tiny amount of deformation. An alternative label, such as "soft touch" could be used. The meaning is qualified based on having a tiny amount of deformation.

In some implementations, altering the one or more configuration parameters of the first sensor includes enhancing the ability of the first sensor to receive sensory input at the first sensory location by increasing resolution of the first sensor by a predetermined amount.

In some implementations, the method further includes: in accordance with a determination that the sensory type is temperature, selecting the enhancements or impairments further based on determining whether a distance between the first sensory location and the first sense location is less than a predetermined amount in a direction normal to the first sensory location's non-deformed baseline location.

In some implementations, altering the one or more configuration parameters of the first sensor includes enhancing the ability of one or more sensors to receive sensory input, at or near the first sensory location, by increasing resolution of the first sensor by a first predetermined amount for each degree of temperature, as sensed by the first sensor, above a predetermined minimum temperature up to a predetermined maximum temperature.

In some implementations, selecting the enhancements or impairments is further based on determining if the first sensory location is deformed by a predetermined amount in a direction normal to the first sensory location's non-deformed baseline location.

In some implementations, altering the one or more configuration parameters of the first sensor includes enhancing the ability of one or more sensors to receive sensory input, at or near the first sensory location, by increasing resolution of the first sensor by a second predetermined amount for each degree of temperature, as sensed by the first sensor, above a predetermined minimum temperature up to a predetermined maximum temperature.

In some implementations, the method further includes: after altering the one or more configuration parameters of the first sensor and/or the one or more configuration parameters of the first artificial neural network: in accordance with a determination that the ability of the first sensor to receive sensory input, and/or the ability of the first artificial neural network to sense properties has not changed within a predetermined time period, impairing the ability of one or more sensors to receive sensory input by decreasing resolution of the first sensor by a predetermined amount. The one or more sensors correspond to sensory locations with a sensory type of light touch.

In some implementations, in accordance with a determination that the sensory type is pressure, selecting the enhancements or impairments is further based on determining whether the first sensory location is deformed by greater than a predetermined amount in a direction normal to the first sensory location's non-deformed baseline location, within a predetermined time period.

In some implementations, altering the one or more configuration parameters of the first sensor includes impairing the ability of the first sensor to receive sensory input at the first sensory location by decreasing resolution of one or more sensors, at or near the first sensory, for a predetermined time period. The one or more sensors correspond to sensory locations with a sensory type of light touch or pressure.

In some implementations, the method further includes, in accordance with a determination that resolution of a subset of sensors of the one or more sensors equals 0, removing the subset of sensors from the first virtual being.

In some implementations, in accordance with a determination that the sensory type is temperature, selecting the enhancements or impairments is further based on determining whether a distance between the first sensory location and the first sense location is less than a predetermined amount in a direction normal to the first sensory location's non-deformed baseline location.

In some implementations, altering the one or more configuration parameters of the first sensor includes impairing the ability of one or more sensors to receive sensory input, at or near the first sensory location, by decreasing resolution of the first sensor by a second predetermined amount for each degree of temperature, as sensed by the first sensor, above a first predetermined minimum temperature or below a second predetermined maximum temperature.

In some implementations, in accordance with a determination that the sensory type is temperature, selecting the enhancements or impairments is further based on determining whether the first sensory location is deformed by a predetermined amount in a direction normal to the first sensory location's non-deformed baseline location.

In some implementations, altering the one or more configuration parameters of the first sensor includes impairing the ability of one or more sensors to receive sensory input, at or near the first sensory location, by decreasing resolution of the first sensor by a third predetermined amount for each degree of temperature, as sensed by the first sensor, above a predetermined minimum temperature or below a fourth predetermined maximum temperature.

In some implementations, the method further includes displaying the first virtual being on one or more displays of the computer system.

In some implementations, the object is a second virtual being, distinct from the first virtual being. In some implementations there are three or more virtual beings, each with its own sensory locations, sense locations, and artificial neural networks.

In some implementations, each sensory location is a point, a one-dimensional segment, a two dimensional area, or a three dimensional region.

In some implementations, each sensory location is an n-dimensional manifold in the virtual environment, with n=0, 1, 2, or 3.

In some implementations, each sense location is an n-dimensional manifold in the virtual environment, with n=0, 1, 2, or 3.

In some implementations, each sensory location corresponds to a respective region, surface, or point, on or within the first virtual being.

In some implementations, the plurality of sensory locations are dynamically generated and associated with specific points and/or areas on the first virtual being when a surface topology of the first virtual being is changing. However, sense properties usually remain constant in their manifold relative positions.

In some implementations, the sensory type includes one or more of: temperature, light touch, pressure, vibration, stretch/compress, sound, and bright.

In some implementations, the method further includes: providing one or more Application Programming Interface (API) calls to update the plurality of sensory locations; and, in response to receiving a call to the one or more Application Programming Interface (API) calls, performing one or more operations selected from the group consisting of: creating, writing, reading, modifying, moving, and/or deleting a sensory location.

In some implementations, the first virtual being comprises a virtual approximation of a body of human, an animal, an insect, a humanoid, or a creature.

In accordance with some implementations, a system for simulating sense data for virtual beings in virtual environments includes one or more processors, memory, and one or more programs stored in the memory. The programs are configured for execution by the one or more processors. The programs include instructions for performing any of the methods described herein.

In accordance with some implementations, a non-transitory computer readable storage medium stores one or more programs configured for execution by a computer system having one or more processors and memory. The one or more programs include instructions for performing any of the methods described herein.

Thus methods, systems, and graphical user interfaces are provided for interactive visual analysis of a data set.

BRIEF DESCRIPTION OF THE DRAWINGS

For a better understanding of the aforementioned implementations of the invention as well as additional implementations, reference should be made to the Description of Implementations below, in conjunction with the following drawings in which like reference numerals refer to corresponding parts throughout the figures.

FIG. 1A illustrates conceptually a process of simulating sense data for virtual beings in virtual environments in accordance with some implementations.

Like reference numerals refer to corresponding parts throughout the drawings.

Figure 1B:
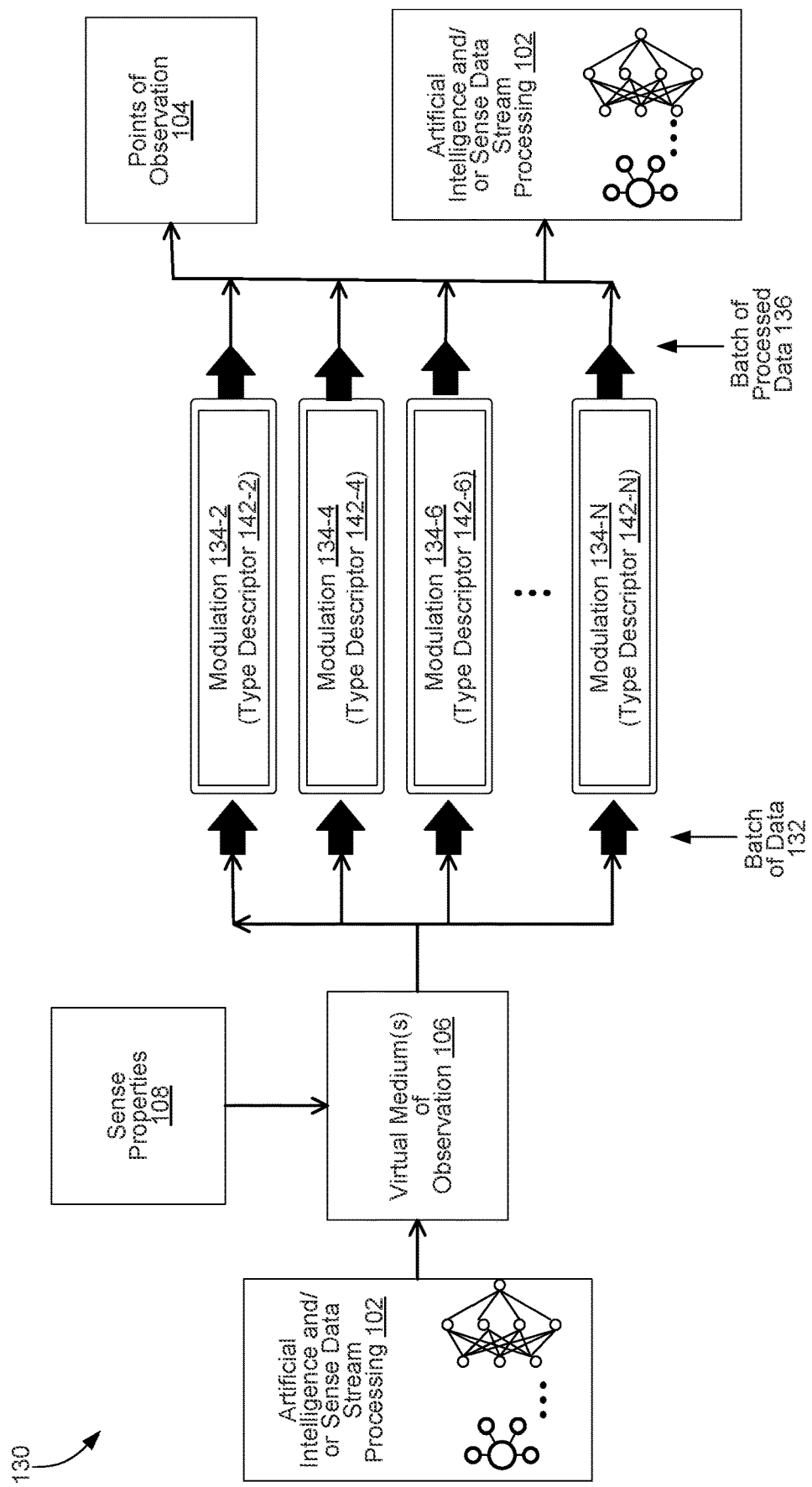
FIG. 1B illustrates a publish-subscribe model of a process of simulating sense data for virtual beings in virtual environments in accordance with some implementations.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

FIG. 1A illustrates conceptually a process 100 of simulating sense data for virtual beings in virtual environments in accordance with some implementations. Some implementations define a virtual being 110, one or more objects and other virtual beings 112, and/or non-objects 114 (e.g., area/plane, space/volume, or points), in a virtual environment. The virtual being 110, one or more objects and other virtual beings 112, and/or non-objects 114 are each associated (as indicated by the lines 124, 126, and 128, respectively) with sense properties 108. Points of observation 104 (e.g., sensors) correspond to sensory locations on the virtual being 110. Locations (or places) of the virtual being 110, one or more objects and other virtual beings 112, and/or non-objects 114, correspond to regions, surfaces, or points, on or in the virtual being 110, one or more objects and other virtual beings 112, and/or non-objects 114, respectively. When the virtual being 110 interacts with the one or more objects and other virtual beings 112, a virtual medium 106 (sometimes called a virtual medium of observation, or a simulated medium of observation) computes what is sensed, based on location and type of the sense properties 108 and points of observation 104. For example, the virtual medium computes/incorporates distance or proximity, contact and/or soft-body deformation between the sense properties 108 and points of observation 104, according to some implementations. The sense properties 108, virtual medium 106, and points of observation 104 each have associated type descriptors (sometimes called sensory types; e.g., temperature). The sensory type or type descriptor is used to match or trigger the corresponding sense properties 108, virtual medium 106, and points of observation 104, when the virtual being 110 interacts with the one or more objects and other virtual beings 112. In some implementations, the virtual medium 106 sets a value of the points of observation 104 in accordance with the interaction. The value can be a closure, or reference or pointer to a programming language type instance that, as an effect, modulates the points of observation 104 on the virtual being 110 (or the body of the virtual being 110). In some implementations, the value is passed along to an Artificial Intelligence (AI) or sense data stream processing 102 (sometimes called AI and/or stream processing module; e.g., artificial neural networks). In some implementations, the points of observation 104 generate data stream synthesized from the value that is changing over time. The data stream may also include pointers of references to programming language types or closures that are used for modulating sensors and/or artificial neural networks corresponding to the virtual being 110.

FIG. 1B illustrates a publish-subscribe model 130 of the process 100 of simulating sense data for virtual beings in virtual environments in accordance with some implementations. In some implementations, the virtual medium of observation 106 acts as a publisher by computing what is sensed, based on location and types of the points of observation 104 and sense properties 108. In some implementations, the sense properties 108 are subscribers to a stream that informs the sense properties 108 to delete itself (from the list of sense properties of the virtual being 110). In some implementations, the points of observation 104 can be described as subscribers and the virtual medium of observation 106 can be described as publishers. The virtual medium of observation 106 produces (or generates) batch of data 132 that is input to one or more streams. Each stream corresponds to a respective modulation (e.g., modulations 134-2, 134-4, 134-6, . . . , 134-N). Each modulation corresponds to a respective type descriptor (sometimes called sensory type), that can be thought of as a channel name. For example, the modulation 134-2 corresponds to the type descriptor 142-2, the modulation 134-4 corresponds to the type descriptor 142-4, the modulation 134-6 corresponds to the type descriptor 142-6, and the modulation 134-N corresponds to the type descriptor 142-6. The streams generate a batch of processed data 136 that is used to alter one or more configuration parameters of the points of observation 10-4 and/or the AI and/or stream processing module 102.

In some implementations, programs that perform operations on the streams are only subscribers, or they may be operators that are both subscribers and publishers, that take input, compute on or transform the input, then publish what is computed or transformed as their output. Operators might merge or split streams. Also AI programs perform operations on the streams. In some implementations, AI programs (e.g., artificial neural networks) are both subscribers and publishers in that the AI programs both receive data or an effect in the stream, and may in turn publish back effect(s) to other streams. In some implementations, an effect is implemented by way of a programmatic type, such as a class instance that gets published to the stream, or alternately by an instruction inserted into the stream to execute a programmatic procedure on the subscriber side. Some implementations use a framework called Combine (provided by Apple's Swift language) that implements reactive programming and includes notions of streams, and publishers and subscribers.

In some implementations, in the publisher/subscriber model, the sense properties publish themselves to the relevant sensors when appropriate conditions are met (e.g., according to sensory type of the virtual medium). For example, for heat or touch, the condition might be proximity; for visual, it might be line of sight. In some implementations, alternatively or additionally, the sensors publish themselves to relevant properties under certain conditions.

Figure 2:
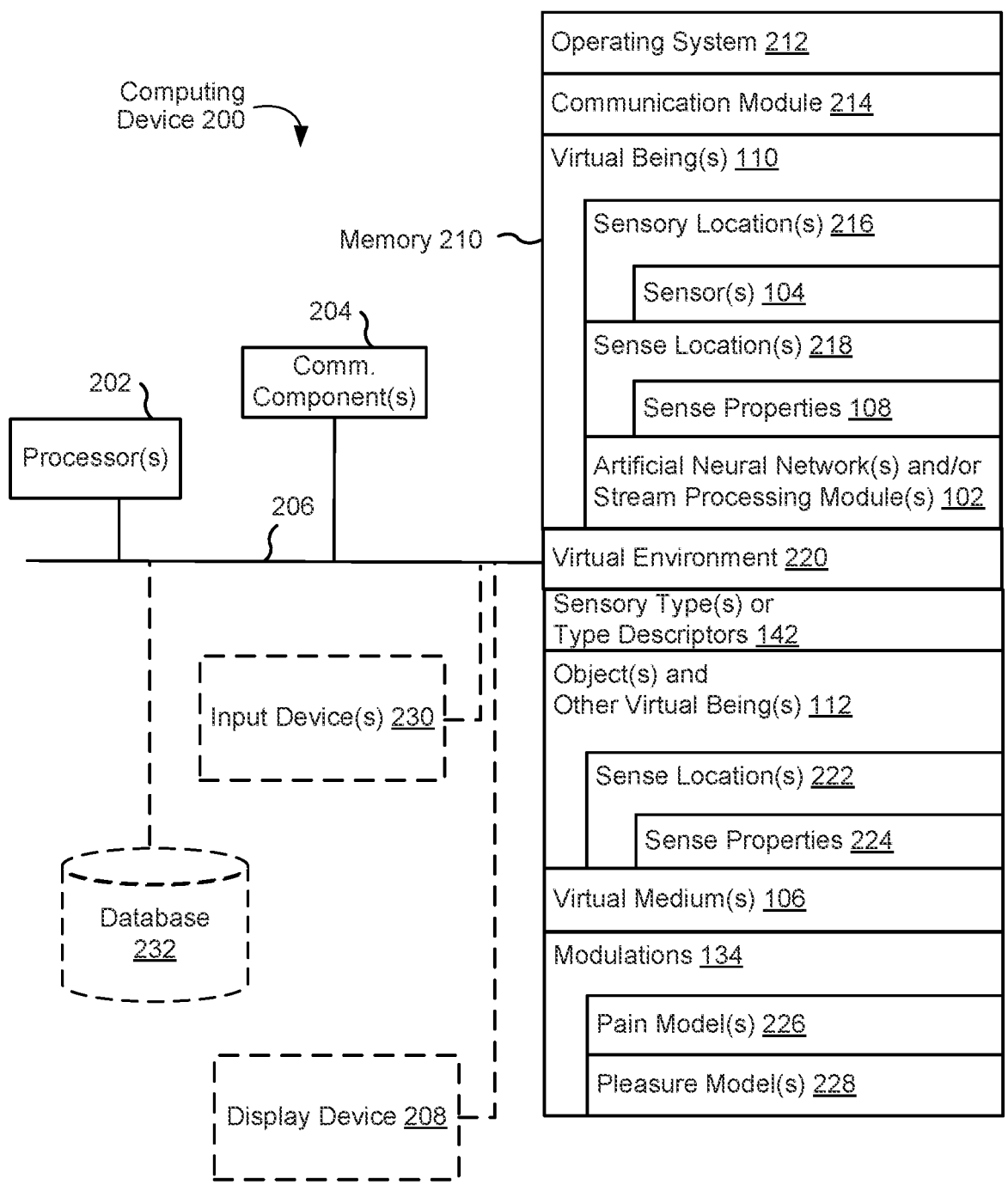
FIG. 2 is a block diagram of a computing device according to some implementations.

FIG. 2 is a block diagram illustrating a computing device 200 that can be used to simulate sense data for virtual beings in virtual environments, according to some implementations. Computing devices 200 include desktop computers, laptop computers, tablet computers, and other computing devices (e.g., smart phones, wearable devices), including computer systems available on demand from a cloud computing service. A computing device 200 typically includes one or more processing units/cores 202 (sometimes called processors; e.g., CPUs, Graphical Processing Units (GPUs), Application Specific Integrated Circuits (ASICs), System on Chips (SOCs), customized CPUs, such as customized RISC-V CPU) for executing modules, programs, and/or instructions stored in the memory 210 and thereby performing processing operations; one or more network or other communications interfaces 204; memory 210; and one or more communication buses 206 for interconnecting these components. The communication buses 206 may include circuitry that interconnects and controls communications between system components, including any optical components. In some implementations, the computing device 200 includes a display 208 (sometimes called a display device) and/or one or more input devices 230. In some implementations, the input device includes a keyboard; in some implementations, the input device includes a "soft" keyboard, which is displayed as needed on the display 208, enabling a user to "press keys" that appear on the display 208. In some implementations, the display 208 and/or input device 230 comprise a touch screen display (also called a touch sensitive display). In some implementations, the display 208 is an integrated part of the computing device 200. In some implementations, the display is a separate display device. Some implementations include cameras, microphones, and/or tactile devices, for interaction with human users and/or the real world.

In some implementations, the memory 210 includes high-speed random-access memory, such as DRAM, SRAM, DDR RAM or other random-access solid-state memory devices. In some implementations, the memory 210 includes non-volatile memory, such as one or more magnetic disk storage devices, optical disk storage devices, flash memory devices, or other non-volatile solid-state storage devices. In some implementations, the memory 210 includes one or more storage devices remotely located from the CPUs 202. The memory 210, or alternately the non-volatile memory device(s) within the memory 210, comprises a non-transitory computer readable storage medium. In some implementations, the memory 210, or the computer readable storage medium of the memory 210, stores the following programs, modules, and data structures, or a subset thereof:

an operating system 212, which includes procedures for handling various basic system services and for performing hardware dependent tasks;

a communication module 214, which is used for connecting the computing device 200 to other computers and devices via the one or more communication network interfaces 204 (wired or wireless) and one or more communication networks, such as the Internet, other wide area networks, local area networks, metropolitan area networks, and so on;

one or more virtual being(s) 110 that includes a plurality of sensory locations 216, a plurality of sense locations 218, and a plurality of artificial neural networks and/or stream processing modules 102. Each sensory location 104 includes one or more sensors 104 (sometimes called points of observation). Each sense location 218 includes one or more sense properties 108. In some implementations, sense data streams (sometimes called stream processing modules) include binary or text data (e.g., formatted data, such as data formatted in JSON). In some implementations, sense data streams are implemented using a protocol over a medium, such as a computer network, computer bus, an optical network. The sense data streams may stream data, or executable binary code, or commands for performing operations, such as a call or a remote procedure, or even source code that gets interpreted or compiled and ran by the receiver. Typically, the sense data streams include sensed data and effects (caused by the sensed or sensory data) that are streamed from the sensors to one or more artificial neural networks. In some implementations, the sense data streams are included in a program (e.g., a Swift program) which means that the sense data streams encapsulate data and compiled class and structure and/or enumerated data instances (or compositions thereof; sometimes called compiled executable code). For example, a compiled class instance that is streamed may carry out some effect on the artificial neural network(s);

a virtual environment 220. Examples of the virtual environment 220 are described below in reference to FIGS. 3A-3D, according to some implementations;

one or more objects and/or other virtual beings 112 that include a plurality of sense locations 222, each sense location storing one or more sense properties 224. Examples of the one or more objects and/or other virtual beings 112 are described below in reference to FIGS. 3A-3D, according to some implementations;

one or more virtual mediums 106 (sometimes called virtual medium of observation). Examples of the one or more virtual mediums 106 are described above in reference to FIGS. 1A, 1B, and are described below in reference to FIGS. 3A, 3B, 3C, 3D, 4A, 4B, 4C, 5, and 6, according to some implementations;

one or more sensory types 142 (sometimes called type descriptors). It is noted that each sensor and sense property of the virtual being 110, each sense property of each object or other virtual being 112, and each virtual medium has a corresponding sensory type. Although FIG. 2 shows the sensory types 142 as a separate data structure, in some implementations, sensory type associated with each sensor, sense property, and/or virtual medium may be a part of each data structure or module; and one or more modulations 134 that include one or more pain models 226 and/or one or more pleasure models 228. Examples of modulations, pain and/or pleasure models are described below in reference to FIG. 5, according to some implementations.

Some implementations include a database 232 used by the computing device 200 for simulating sense data for virtual beings in virtual environments. In some implementations, data sources of the database 232 can be stored as spreadsheet files, CSV files, XML, files, flat files, JSON files, tables in a relational database, cloud databases, or statistical databases.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 210 stores a subset of the modules and data structures identified above. In some implementations, the memory 210 stores additional modules or data structures not described above.

Although FIG. 2 shows a computing device 200, FIG. 2 is intended more as functional description of the various features that may be present rather than as a structural schematic of the implementations described herein. In practice, and as recognized by those of ordinary skill in the art, items shown separately could be combined and some items could be separated.

Figure 3A:
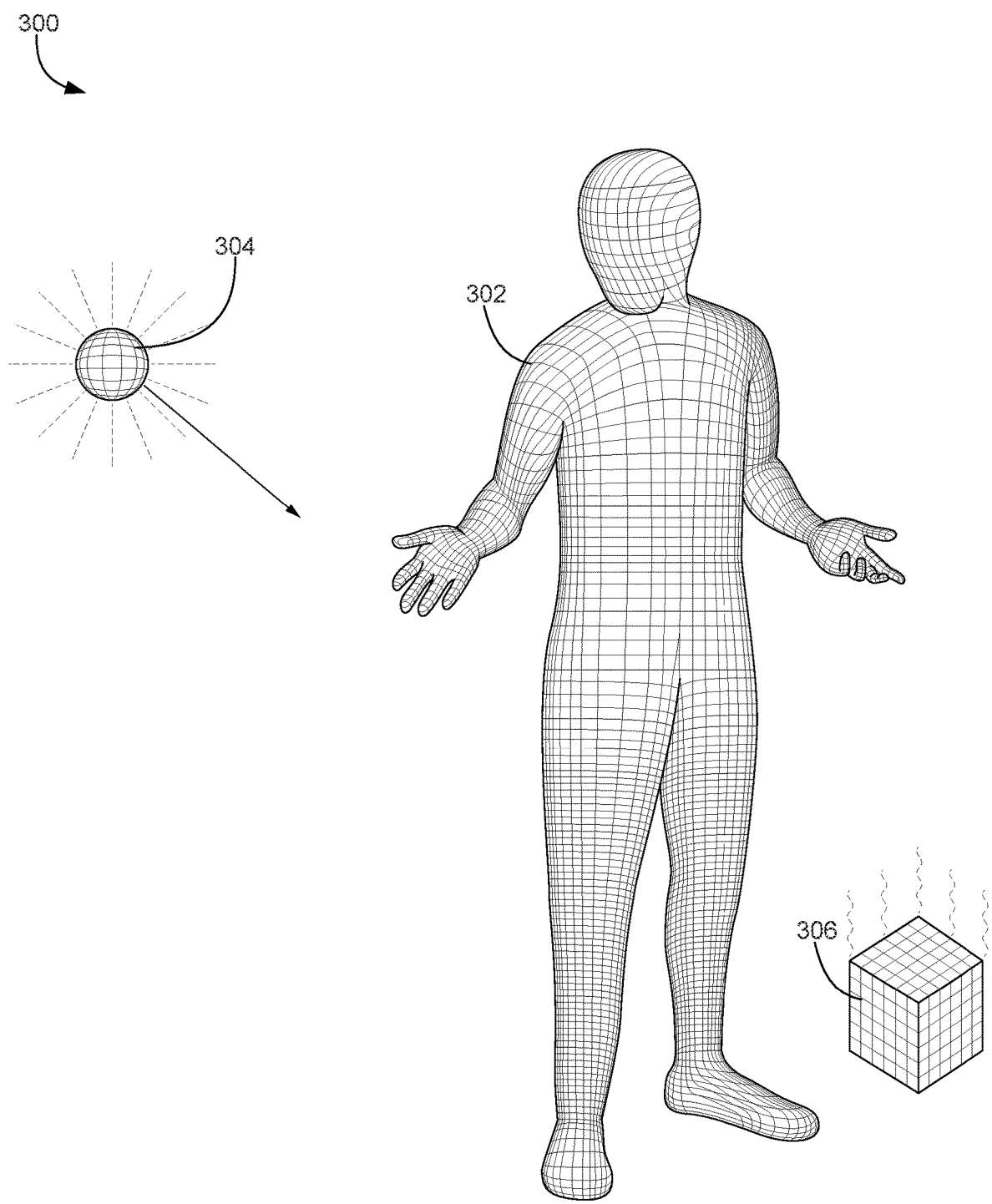
FIGS. 3A, 3B, 3C, and 3D show an example of simulating sense data for virtual beings in virtual environments in accordance with some implementations.
Figure 3B:
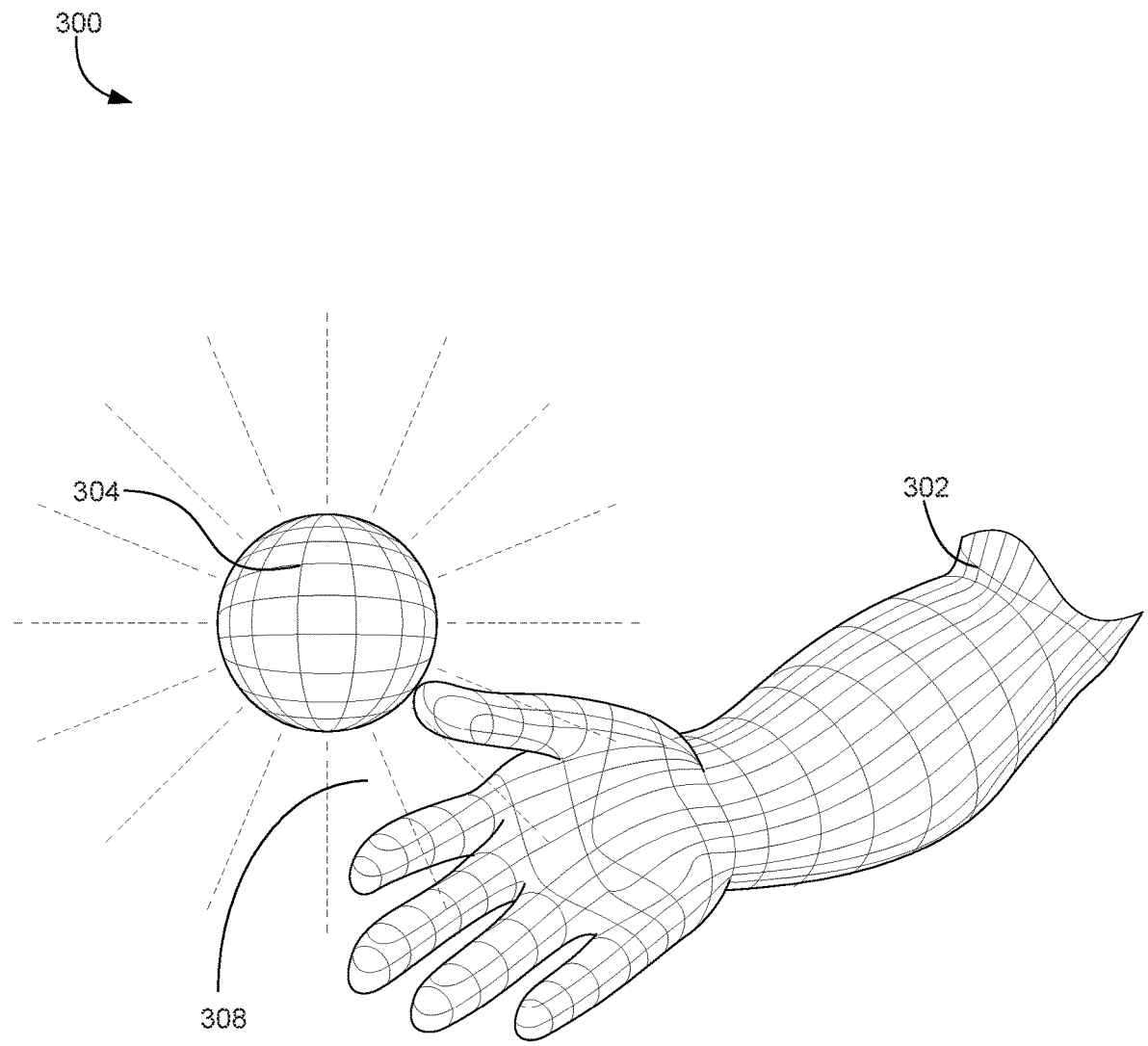
Figure 3C:
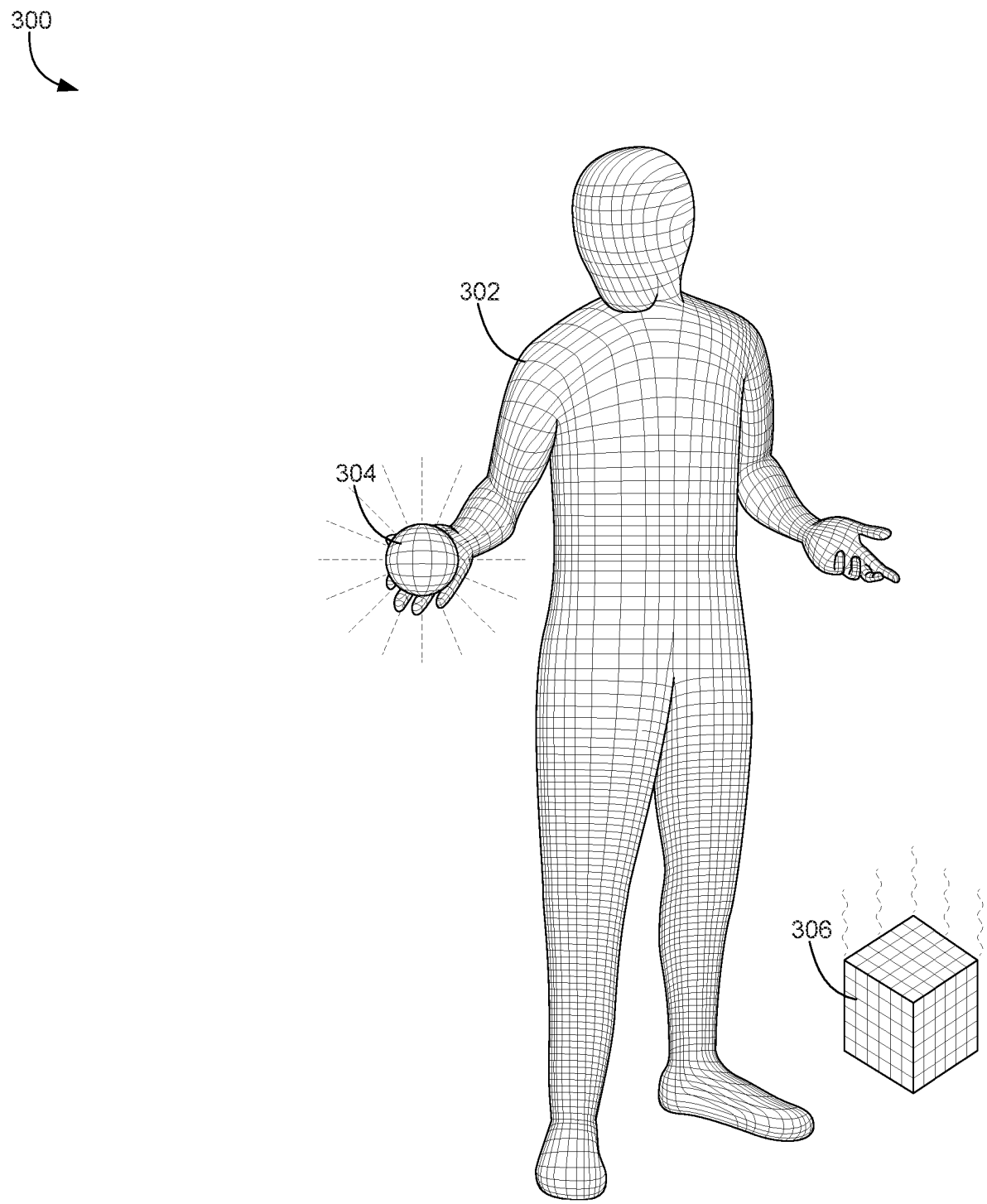
Figure 3D:
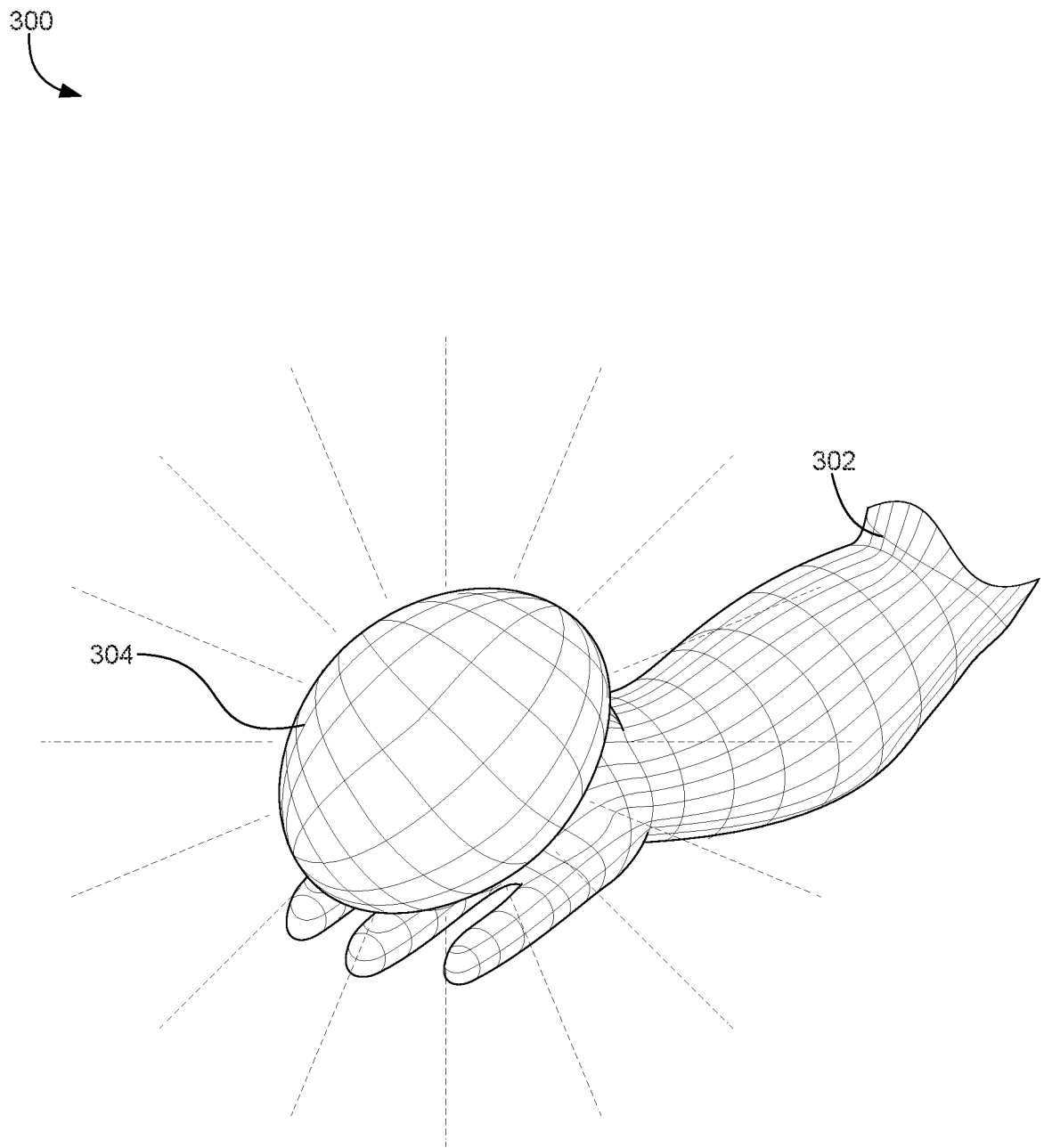

FIGS. 3A, 3B, 3C, and 3D show an example of simulating sense data for virtual beings in virtual environments in accordance with some implementations. FIG. 3A shows a virtual being 302 in a virtual environment 300 that includes two objects 304 and 306. The object 304 is spherical in shape, is deformable, has light or bright (brightness) sense properties (as indicated by the glow around its surface), and is movable as indicated by the arrow pointing away. It is noted that the light should not be confused with a 3D engine light source or anything that appears bright as rendered. The object may have an appearance of brightness, but the bright sense property is conveying a pain effect via a bright virtual medium to sensors of sensry type bright, according to some implementations. The object 306, on the other hand, is cuboidal in shape, is hot (as indicated by the waves propagating away from the top of its surface), and is static (or not movable). It is noted that an object that has an appearance when rendered by a virtual camera of being hot is not the same thing as an object with a temperature sensory type in a high range, according to some implementations. In FIG. 3A, the virtual being (e.g., a model of a human; sometimes called an avatar) has its head turned towards the object 304. FIG. 3B shows a view when the object 304 is about to land on a palm of the virtual being 302, FIG. 3C shows the object 304 landing on the palm of the virtual being 302, and FIG. 3D shows the object 304 deforming (sometimes called soft body deformation) based on an impact between a surface of the object 304 and the palm. It is noted that although FIGS. 3A and 3C do not show eyes, nose, mouth, tongue, teeth, eyebrows, hair, fingernails, and many other physical body feature details, such model details will be used in some implementations for simulation of the virtual being 302. According to some implementations, body regions of the virtual being 302 have sense properties affecting points of observation on itself and other bodies or objects, and include one or more type descriptors (e.g., temperature, light touch, pressure, stretch). The virtual being 302 includes several points of observation, each associated with type descriptor (e.g., temperature, light touch, pressure, stretch/compress). In some implementations, the three-dimensional space (e.g., region 308 shown in FIG. 3B) between the object 304 and the virtual being 302 can be associated with one or more virtual medium of observation with distinct type descriptors (e.g., temperature, light touch, pressure, vibration), used to simulate distance and/or soft-body deformation (oscillatory soft-body deformation for vibration) when surfaces come in contact. The object 304 includes multiple sense properties (e.g., sense properties with type descriptors temperature, light touch, pressure, vibration, and stretch).

Some implementations use a model for an avatar. Some implementations use skinning, skinning deformers, skin cluster, and/or skeletons (e.g., skeleton made using Autodesk Maya or similar 3D computer animation software with modeling, rendering, simulation, texturing, and animation tools used by artists, modelers, or animators). Some implementations use one or more rigs made using an iterative rigging framework, such as mGear. In some implementations, the model, skinning and mesh are exported from a 3D computer animation software, such as Maya, and imported into a high-level 3D graphics framework (e.g., Apple SceneKit) used to create 3D animated scenes and effects in mobile applications. Some implementations use SceneKit as the virtual environment for a prototype, and SceneKit can be used for both iOS and Mac OS programs. Some implementatiions use a Mac OS Swift program or Multiplicity that uses the SceneKit framework for the simulation engine providing game engine features. Some implementations use Unreal Engine. Some implementations use Unreal Engine and SceneKit Mac OS apps. In some implementations, the rig (e.g., rig with solvers) is also recreated in the 3D graphic framework (e.g., SceneKit) to programmatically drive animation. In some implementations, portions of the iterative rigging framework are ported to or implemented in the 3D graphics framework. In some implementations, the rig is driven by one or more machine learning algorithms, systems, and/or programmed algorithms (e.g., the AI brain). In some implementations, Swift-based APIs for the avatar and AI brain Interface are in the SceneKit context. Some implementations use one or more SceneKit classes with the avatar, such as SCNIKconstraint, SCNSkinner, SCNMorpher, SCNShadable, SCNProgram, and/or classes that provide similar functionalities.

In various implementations, the virtual being 302 is a rigged avatar of a human body, a virtual approximation of a body of human, an animal, an insect, a humanoid, or a creature, an object with virtual mobility, an object that is dynamically altered in shape, size, or form, an object with a skeleton and skinning, an object that is altered using skeleton joints, blend shapes, rigging and its articulation including solvers, such as Forward Kinematics (FK) solver and Inverse Kinematics (IK) solver, and/or programs that trigger baked animations that update joint values during animation, and various soft body deformation. In some implementations, the virtual being 302 may employ Artificial Intelligence (AI) or Machine Learning (ML) algorithms to learn to move itself in the virtual environment 300 by actuating and/or modulating values for the rig/rigging system, dynamically triggering baked animation that change joint values, and/or dynamically actuating movement or using action control APIs present in the virtual environment 300.

In some implementations, when simulating sense data using a virtual body (sometimes called a virtual being or an avatar) is compute intensive, some of the simulation is offloaded to a real-time 3D creation platform (e.g., Unreal Engine) and/or a computation platform that enables the creation of massive simulations and virtual worlds for use in video games (e.g., Improbable's SpatialOS), or a similar cloud game engine platform. Some implementations use a bridge to extend SpatialOS type capabilities to SceneKit.

In some implementations, the virtual body 302 has eyes, ears, nose, mouth and skin senses that approximate the human eyes, ears, nose, mouth and skin senses, in form and/or function. In some implementations, a majority of systems of the human body have associated approximation models in the virtual body and/or the AI brain.

Some implementations use stock 3D models used in 3D graphics, such as models supplied by TurboSquid, and/or augment the models with one or more sense properties.

Some implementations build a human body approximation using 3D game engine and computer animation and modeling technology that provide AI brain algorithms with sense data. The virtual body is controlled by the AI brain algorithms. Some implementations use the AI brain algorithms to control the skeleton, skinning, mesh, and/or body rigs, using Inverse Kinematics solvers (IK solvers) and similar solvers. In some implementations, sense systems of the body and the AI brain algorithms inter-modulate. Some implementations simulate details, such as breathing and inter-modulation of various bodily systems. Some implementations use prebaked animations, and a rig and/or rigging system that runs in the context of the game engine. Typically, the rig and/or rigging systems are used in an animation and modeling tool by an animator. In some implementations, for this approximation, the rigs are programmatically actuated using machine learning algorithms.

In some implementations, the virtual environment 300 includes surfaces, manifolds, and/or point clouds. In some implementations, the virtual environment 300 is simulated using a game engine, a simulation engine, physics and/or rendering engines. In some implementations, the virtual environment 300 is a rigged environment. In some implementations, the virtual environment 300 is simulated using a cloud platform game and simulation engine, where simulation and rendering are partitioned and handled by cloud servers and cloud infrastructure.

In some implementations, the virtual environment 300 is created for the avatar (sometimes called the virtual body or the virtual being 302) to interact with. In some implementations, the virtual environment 300 is real-world like, and includes simulations and/or approximations of real-world things. For example, some implementations simulate air and/or water. Some implementations use real fluid and/or air flow simulations. Some implementations provide tools for adding real-world properties to models. In some implementations, such properties comprise weight, temperature, taste, texture, and odor. Some implementations define sensors, virtual mediums, and/or sense properties for taste sensory types (e.g., salty, sour, sweet, umami, astringent, pungent, bitter), and/or for olfactory or smell sensory types (e.g., sweet, fragrant, woody/resinous, fruity (non-citrus), chemical, minty/peppermint, popcorn, lemon, decaying (sickening), pungent (sickening)).

In some implementations, objects that come into contact with other objects create sounds and the sound propagation is approximated with sound ray tracing and/or sound path tracing techniques.

Some implementations extend 3D polygon mesh assets with real world properties that can be sensed. Examples of such properties include weight, temperature, taste, texture, and odor. Some implementations simulate sound. It is noted that, in some implementations, although weight is already a game engine gravity effect, the weight is also sensed by the virtual sensors with sensory types pressure and light touch.

Some implementations simulate common real-world things or objects that are solid, liquid, or gas. In some implementations, such things or objects exhibit sense data when contacted by and/or interacted with the body. In some implementations, contact is by way of a simulated medium of observation approximating the real world mediums of observation like light, sound, or certain types of molecules that can be sensed by a simulated olfactory and taste system.

Some implementations extend conventional techniques that simulate sense data using mathematical models of human body parts, such as three-dimensional (3D) body finite-element models that use discrete point data generated using body scanning. Some implementations simulate tactile signals for a hand (e.g., with millisecond precision), and use 3D finite-element models of humans and/or animals. For example, some implementations use models of monkey fingertips to simulate the mechanics of tactile sense. Some implementations use data from smart skin and/or nanowire sensors.

Some implementations model real-world objects using fundamental qualities. Such objects are made of atoms or molecules. The fundamental qualities of objects can be observed by point(s) of observation by way of medium(s) of observations. In some implementations, the mediums of observation (sometimes called virtual mediums of observations) are virtual substitute mediums for real world mediums of light, sound, and forces.

Some implementations use machine learning algorithms that are "fundamental quality representation and recreation algorithms" (FQRR) that accept data input, learn to predict, classify, store encoded patterns, then learn to recreate the patterns without external input, are algorithms that can be used for strong AI, as opposed to machine learning algorithms that are most often "label representation algorithms" that accept data input, and only learn to predict and classify patterns.

In some implementations, fundamental qualities are intrinsic to an object in that they exist independent of how they are being observed. Fundamental qualities include the qualities of action reaction between objects. Any particular wave is also a fundamental quality. Wave is defined as a disturbance moving through a medium.

In the human body, by way of points of observation in the body, the brain is observing, by way of a medium of observation, such as light, a slice of what exists in reality and is attempting to recreate the "information" that are the fundamental qualities of the thing that is observed. A fundamental quality can be that an object has a certain shape with specific salient features, or that it absorbs certain wavelengths of light while reflecting other wavelengths of light which here is our medium of observation. Salient features of an object are also fundamental and emergent qualities. Salient features are different at different scales. At the atomic scale, they are things like wavelengths being absorbed, or reflected or re-emitted. Of course, if the medium of observation is only reflected light, then not all of the fundamental qualities are observed and recreated.

To further illustrate the concepts, suppose a human observes a metal sign pole and walks over to it and tastes it, then the human is observing another fundamental quality. When the human tastes something, the human observes some fundamental qualities through the taste points of observation (taste buds) and transforms it into a perception. Perceptions are not merely a label (e.g., the thing observed is sweet and has X quantity), but rather the micro scale shape of the molecules in food and their energy states as sampled, encoded and recreated by the human brains, processes that are referred to as fundamental quality representation and recreation (FQRR) algorithms. One key difference between a brain and a computer is that the brain captures and recreates the essence of objects in the real world with its form of FQRR algorithms, whereas computer recognition programs and most weak AI are label representation (LR) algorithms. The term essence in this context means a representation of some fundamental qualities that reflects accurately or is at least an approximation of what the form of the thing observed, versus just a label. Some implementations use FQRR algorithms that use observed fundamental quality information propagated by way of a medium of observation and as observed by some number of points of observation in a body. In some implementations, a FQRR algorithm recreates the fundamental qualities. In some implementations, a FQRR algorithm recreates a partial and/or incomplete slice of the reality observed by the human (or the virtual body). FQRR algorithms are central to perception, and active perception leads to awareness.

In nature, objects absorb certain wavelengths of light and reflect the light having wavelengths that are not absorbed. The medium of observation, the light, reaches the lens of our eyes and is focused on the retina and fovea. The eye is mechanical in that it is made to extract the fundamental qualities of the object being observed, such as color, shape, and salient features. However, the object has other fundamental qualities that are not being observed. For example, the object may provide sense data by way of the medium of observation, points of observation (for the type of sense data). In some implementations, a FQRR algorithm processes this sense data to obtain a taste and/or smell perception.

Compounds that are senses with taste olfactory senses also exist in reality. Such compounds are comprised of atoms and molecules. When taste buds and olfactory senses come into contact with a substance, they are extracting and conveying some set of fundamental qualities about the substance. That is its shape, and salient features that are fundamental. The brain then takes this information about the fundamental qualities and attempts to reconstruct those fundamental qualities from and as-stored representations. Some implementations mimic this human behavior using memory that is multidimensional (e.g. temporal and spatial), and/or using recursive computations. In some implementations, a result of the computation(s) is a literal recreation of the fundamental qualities as observed (salient features as observed through points of observation).

To facilitate simulation of an approximate body, some implementation use the following definition of observation and points of observation. In the human body, nerve cells are points of observation. Observation is complex and involves body topology, makeup, and the topology and kind of the points of observation.

It is noted that the FQRR algorithms described above are not a mere recording of information. The FQRR algorithms involve the type of points of observation, and their topology in the body. Further, the FQRR algorithms include encoding and storing what is observed, and decoding and re-creation of information from a representation or set of representations previously encoded. Algorithms that involve discrete encodings without the mechanisms to decode and assemble them into something greater are LR algorithms. LR algorithms are pruned and a limited number are encoded and stored in what is roughly analogous to dictionaries. FQRR algorithms use dynamic dictionaries of LR algorithms.

In some implementations, points of observation are points on a body that observe. For example, the retina and fovea are a surface with points of observation. In some implementations, the tongue is another topology having taste buds of different kinds as points of observation.

Points of observation observe fundamental qualities of reality by way of a medium of observation. For example, the human eye retina and fovea are a surface containing points of observation that are rods and cones. By focusing the medium of observation, light, on the retina, the eye lens captures the fundamental qualities of something in reality, like shape and color of objects. Some implementations calculate relative location in a 3D space as a dynamic quality, processed by a plurality of FQRR algorithms. Some implementations use a movable virtual body.

To further illustrate FQRR algorithms, consider an image of a collage of photos that resembles the iCub robot (e.g., the well-known iCub image). Each photo in the set or collage can be considered to be an LR algorithm, and the set can be considered to be a dictionary. Suppose further that the set only allows one of each image to be stored. The entire collage can also be considered an LR if stored as an array of pixels. A FQRR algorithm observes the iCub robot in reality, then by way of using previously encoded and stored images in the set, the algorithm can recreate the representation of the collage. The FQRR algorithm can also identify the collage when presented with internally generated data signals that create an image of the iCub robot.

To illustrate that active perception is awareness to some degree, suppose a person's hand touches something hot, sense data from the nerves of the hand allows the person to form a perception of hotness. The response is to pull the hand away. The prediction that pulling the hand away will take away the perception of hotness and replace it with another anticipated perception is active perception or awareness. To illustrate further, consider another example. When a person turns their head to see someone in the room they previously saw, they have formed a partial perception. When they see the person, the perception is fully manifested, and this entire process is active perception and awareness. Otherwise, they would just turn their head and be surprised. Perception involves FQRRs which involves memory and the ability to recreate. Reaction alone is not awareness as it involves no perception only a measurement and an instruction. For example, a robot arm with a heat sensor may have an instruction to retract the arm when the temperature read by the sensor is above 200 degrees C.

Qualia are individual instances of subjective, conscious experience, such as pain due to a headache, or the taste of a wine. Perception as described herein is qualia. A wavelength of light that is called red does not have red. What red is, is a higher level perception of how the object is interacting with the medium of observation. Red is qualia as is everything that the brain interprets with its form of FQRR. Light waves in a range and frequency labelled as red is not the red qualia or red perception. Perception of red is an emergent property of FQRR.

Mental model corresponds to perceptions that in turn correspond to qualia. It does not objectively matter that green is seen as green or as red, when referring to a thing in reality that absorbs blue and red light and reflects green light because that thing exhibits certain absorption and reflection as a fundamental property. Some implementations build a mental model, a FQRR, of observed sense data, and that mental model is created the same way for the human species, so the mental model is equivalent to perception which is in turn equivalent to qualia. In other words, the mental model that is equivalent to perception which is in turn equivalent to qualia of red is the same for different individuals, because the architecture for sensing (the points of observation in the body) and creating the mental model is the same. Another species, such as a butterfly, likely does not have the same mental model and perception of red as humans do. Butterflies and bees see colors that humans do not see. Qualia that is equivalent to perception that is equivalent to mental model of any color is likely to be different across a species. Humans form no mental model of colors that they don't sense (i.e., have points of observation for).

Common frames of reference is having mental models that are equivalent to perceptions that are equivalent to qualia that are similar but not necessarily equivalent. For example, as described above, humans do not see all the colors that butterflies see and therefore do not have the perceptions of these colors. However, humans do have perceptions of other colors so humans form higher level perceptions that can extrapolate to a degree what it means to have a perception of another color that they don't see.

Common frames of reference is equivalent to similar mental model which is equivalent to similar perception which is in turn equivalent to similar qualia. Pain is perception and although pain perception may differ between humans, they are similar enough to say that humans have a common frame of reference. Common frames of reference is inclusive of the cases where perception of something is likely to be nearly exact such as when two humans are perceiving colors, versus only similar as it would be between a butterfly and a human. That is, common frames of reference is inclusive of the exact model which is equivalent to exact perception which is in turn equivalent to exact qualia and similar model, similar perception, and similar qualia.

Common frames of reference facilitate quicker transfer of mental models, perceptions, and qualia between humans or an AI. Without common frames of reference, language does not work well in conveying or transferring perception. Common frames of reference, perceptions of language constructs associated with other perceptions, make it easier for the brain to internally recreate sense data that gets turned back into perception. Common frames of reference is applicable to having similar sets of perceptions that contain similar perceptions.

With regards mental models as it relates to scale, the mental models of sound and vision differ partly because they are at different scales. As a medium of observation, sound travels slower and is more local in its interactions with things in reality. Humans' perception of sound is different than a bat's perception, because the bat is using sound to navigate. A bat's perception of sound is visual, whereas human perception of sound is not visual. In other words, a bat's brain FQRRs are creating a slice of reality that recreated the spatial relationships of things around it. The set of salient features that are pertinent to navigation are different than the salient features pertinent to differentiating sounds. Sometimes called "computed salient features", these are more or less higher-level perceptions and or artifacts of topology and the type of the points of observation.

Some implementations take into account topology in the body and type of the points of observation is what provides the sense data needed to form perception. To form perceptions that require certain sense data, such sense data needs to be acquired. If the topology and type of points of observation between two systems corresponding to two different species are different, the processing of information by their body's points of observation differ in that they don't extract similar salient features, then the mental model or perception or qualia will be different.

There are emergent salient features in reality when viewed at different scales. For example, a sign on the road is made up of trillions of atoms. At the atomic scale, there is no sign but just atoms. Taken in totality at a different scale, there are the emergent features of the sign and the shapes. The difference between seeing in black and white and seeing in color is that in one case there is a mental model, perception, or qualia based on sensory data from points of observation that are of a type that is equally sensitive to all visible wavelengths. Whereas, with color sensory data, there are three different kinds of points of observation, each sensitive to red, green or blue wavelengths. The mental model, perception, or qualia differentiates the color spectrum. Put another way, perception is built from sense data of fundamental qualities of spatial separation between points or things being observed in reality, and the light absorbing and reflecting fundamental qualities of those things or points.

Awareness of something arises through active observation and perception. In some implementations, the set of FQRRs has mechanisms that direct active observation and predict perception, thereby generating or causing awareness.

Some implementations include AI-based language capabilities (e.g., natural language processing skills). Some implementations master such skills by acquiring an approximation of the mental model, perception, or qualia of experience. The quality of any AI's language capabilities is correlated with the richness of its experience spectrum. As described above in the Background section, to have a rich set of experiences across a spectrum requires the AI to have a body with a large set of senses and an environment that closely approximates the real world or is the real world. Since inserting the AI into a mammal body is not possible at the current time, some implementations use a virtual body and environment.

Some implementations use pain and/or pleasure models as primary mental model, perception, or qualia. In some implementations, pain and pleasure perceptions results from complex sense data (sensation) from the body which includes the AI brain. In some implementations, pain perceptions are generated from sense data that correlates to be generally bad for the avatar body and the AI brain. In some implementations, pleasure perceptions are generated from sense data that correlates with the avatar body and brain being in a state of well-being.

In some implementations, sense data has emergent salient features that are directly related to the topology of the body and its points of observation. In some implementations, further active control of the body or parts of the body creates new topology and dynamic salient features and perceptions. To illustrate, when a person blows up their mouth with air, that is an active control that makes for stretching, that causes nerves in the face to send sense data to the brain. It is different than, for example, when light impacts the cones and rods of the retina. In the case of the retina, the sense data is passive since it is from observation of things external to the body and it is not actively changing the topology and firing of the nerves.

Figure 4A:
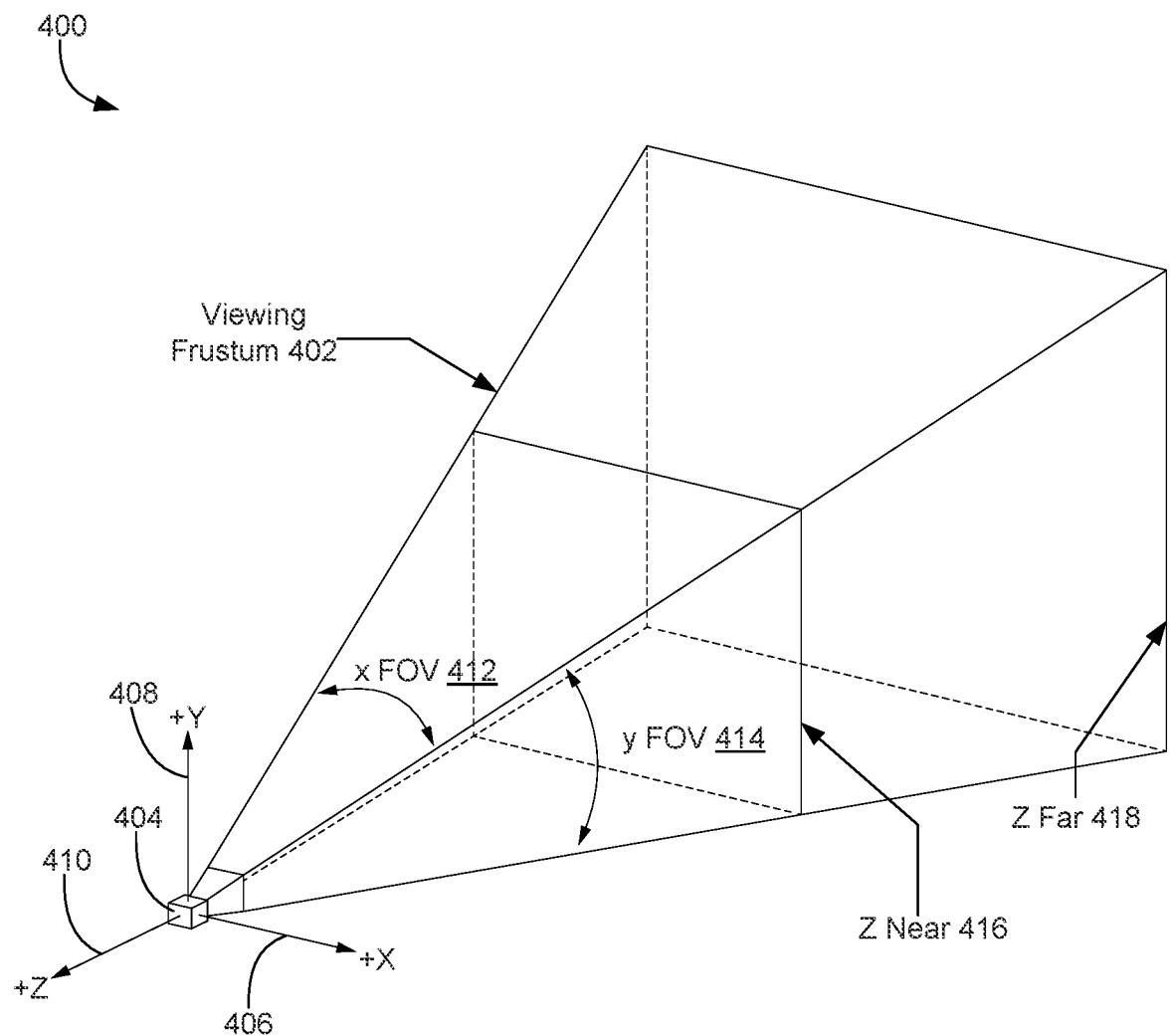
FIGS. 4A, 4B, and 4C show an example of simulating human vision according to some implementations.
Figure 4B:
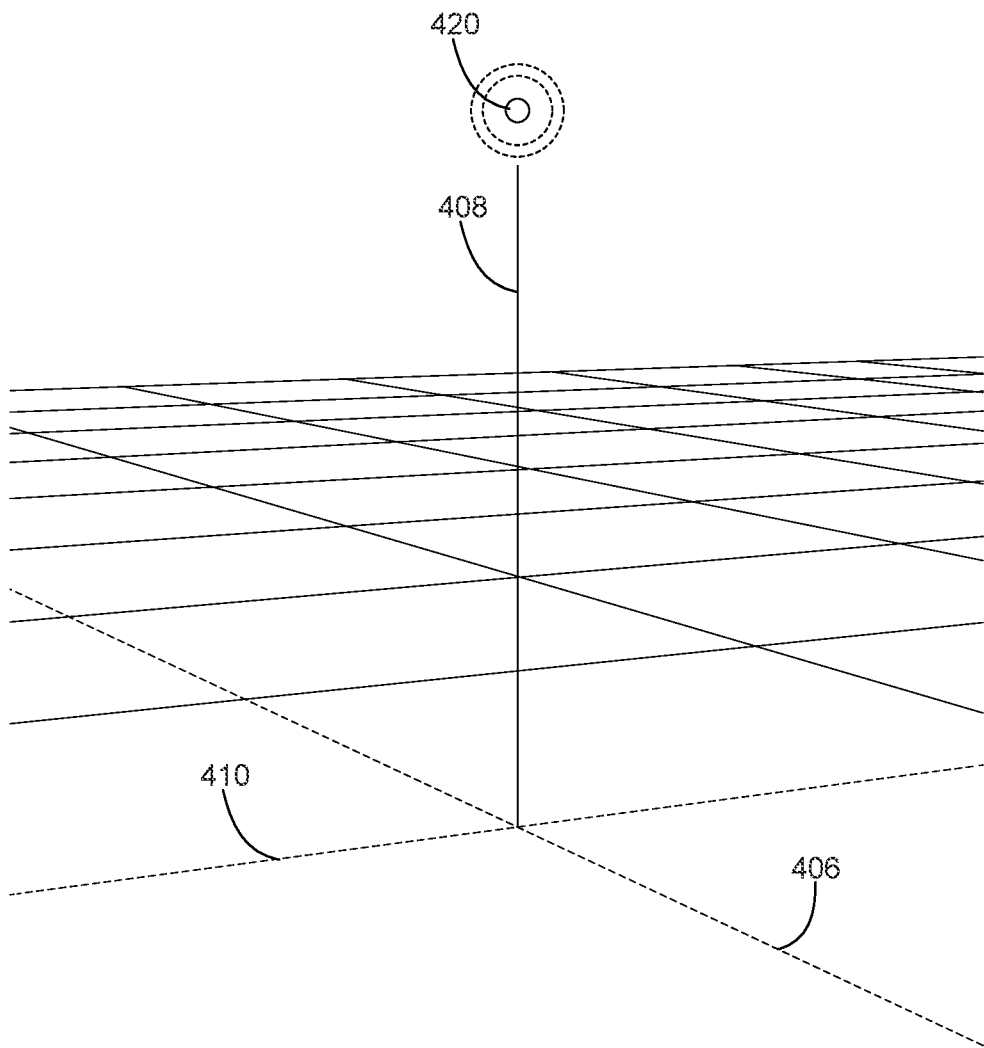
Figure 4C:
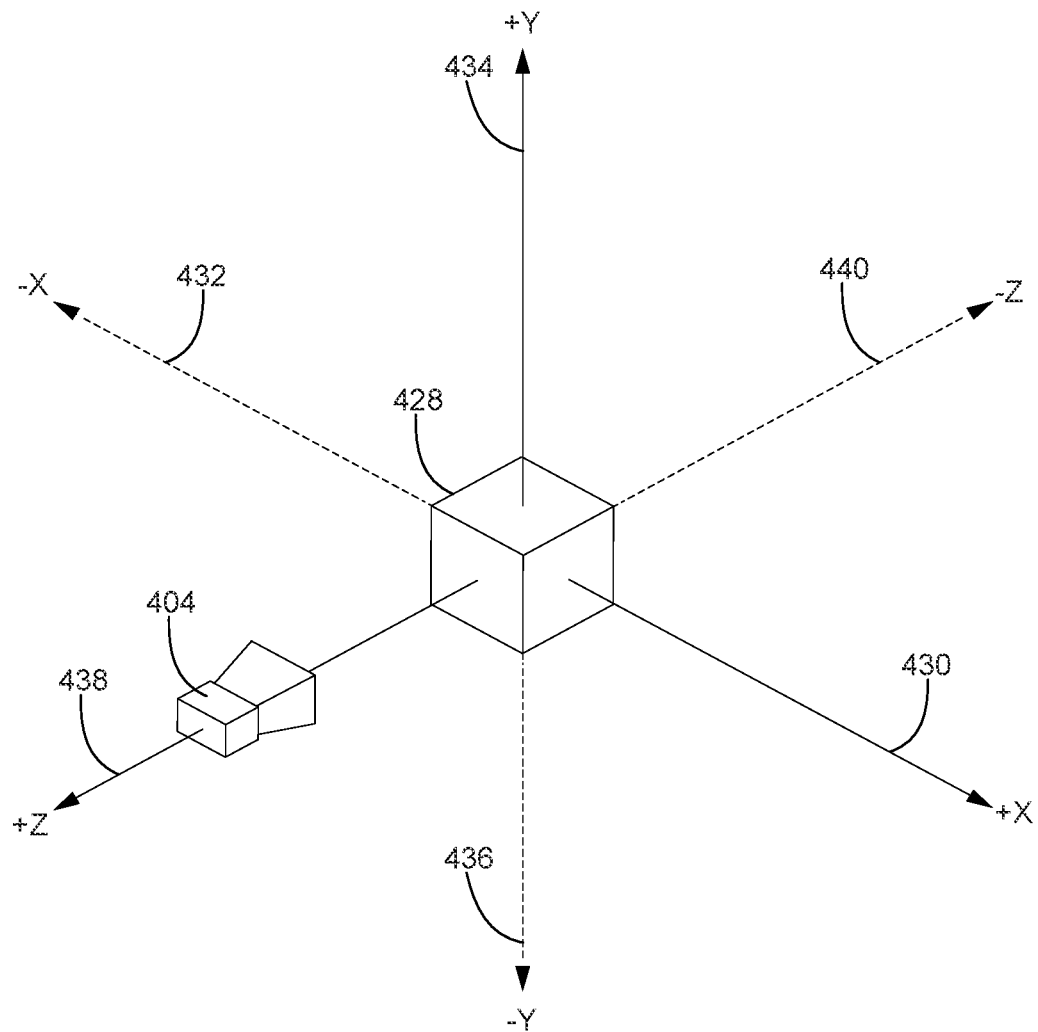

FIGS. 4A, 4B, and 4C show an example of simulating human vision (sometimes called eye simulation) according to some implementations. For the sake of illustration, suppose the virtual medium of observation is a rendered frame output from a camera. The output affects points of observation mapped to the rendered output. In the description that follows, the virtual medium of observation is rendered frames, whereas with skin senses (light touch, pressure, vibration, heat, stretch), the virtual medium of observation computes soft body deformation. In this way, the virtual medium of observation can differ depending on what is being virtually sensed. Some implementations use points of observation, virtual medium of observation, and sense properties to simulate human eye retina and/or fovea, according to techniques described herein.

The human retina contains about 120 million rod cells, and 6 million cone cells. Some implementations approximate the human eye using a virtual camera similar to how game and animation engines use the concept of a virtual camera and virtual lighting sources. FIG. 4A shows an example 400 of a camera frustum 402 (sometimes called a viewing frustum), according to some implementations. A virtual camera 404 includes a Field of View (FOV) is pointed at a three-dimensional (3D) space as indicated by the three axes, x-axis (406), y-axis (408), and z-axis (410). FIG. 4A also shows angles for the field of view (e.g., x FOV 412, and y FOV 414), two planes of view, z Near plane 416 (closer to the camera) and z Far plane 418 (further away from the camera along the z-axis). FIG. 4B shows a virtual lighting source 420, according to some implementations. In FIG. 4B, the virtual lighting source 420 is shown aligned with the y-axis 408, in some implementations.

In some implementations, to simulate a 3D scene (sometimes called a virtual environment), virtual cameras are associated with fixed locations or attached to objects that move or otherwise moved about. In some implementations, objects in the scene that fall between the z Near plane 416 and z Far plane 418 of a camera are rendered out to frames, typically at 60 frames per second. In some implementations, objects or surfaces (or part thereof) in a 3D scene are associated with sense properties (for example, with type descriptor bright).

In some implementations, when objects are between the z Near plane 416 and z Far plane 418, the objects get rendered, and if they have additional sense properties of sensory type bright, then affect points of observation with sensory type bright. The additional sense properties might correspond to the X and Y pixel locations of each rendered frame. Alternately, in some implementations, points of observation are mapped to a region of pixels for each rendered frame. For example, each point of observation is mapped to 2-by-2 pixels or 3-by-3 pixels, instead of a one-to-one mapping.

In some implementations, for eye and/or retina simulation, pixel values of each frame that are part of a stream of rendered frames are post processed and used to set values for associated points of observation to cause the points of observation to have light responses and characteristics that approximate the response characteristics of rods and cones in the human eye. In some implementations, as discussed above, additionally, those points of observation may also have one or more type descriptors that match with the type descriptors of sense properties associated with objects in the scene currently being rendered. For example, the points of observation mapped to an (X, Y) pixel coordinates of rendered frames may have a type descriptor bright. If an object being rendered also has sense properties of type descriptor bright, then they would have an additional affect (modulation or attenuation) on the points of observation, and potentially a modulating or attenuating effect upstream of the points of observation on programs that perform operations on the stream, and/or AI programs (e.g., artificial intelligence programs, sense data stream processing, artificial neural networks and/or stream processing modules 102).

FIG. 4C shows the virtual camera 404 pointed at a cube 428, according to some implementations. Position of the cube 428 is indicated by a line+X (430) to −X (432) aligned with the x-axis 406 (shown in FIG. 4A), line+Y (434) to −Y (436) aligned with y-axis 408 (shown in FIG. 4A), and line+Z (438) to −Z (440) aligned with the z-axis 410 (shown in FIG. 4A). In some instances, the cube 428 is a normal cube in which case it is rendered into each frame, and then that stream of frames would affect mapped points of observation to simulate response and/or characteristics of human retina rods and cones. In other instances, a similar cube can include sense properties (e.g., type descriptor bright) mapped onto one or more of its six surfaces. If the points of observation mapped to the rendered frame output of the camera also have the same type descriptor (i.e. bright), then the points of observation are affected in some additional way, via attenuation or modulation, and/or according to one or more pain and/or pleasure models, as described below in reference to FIG. 5, according to some implementations.

Figure 5:
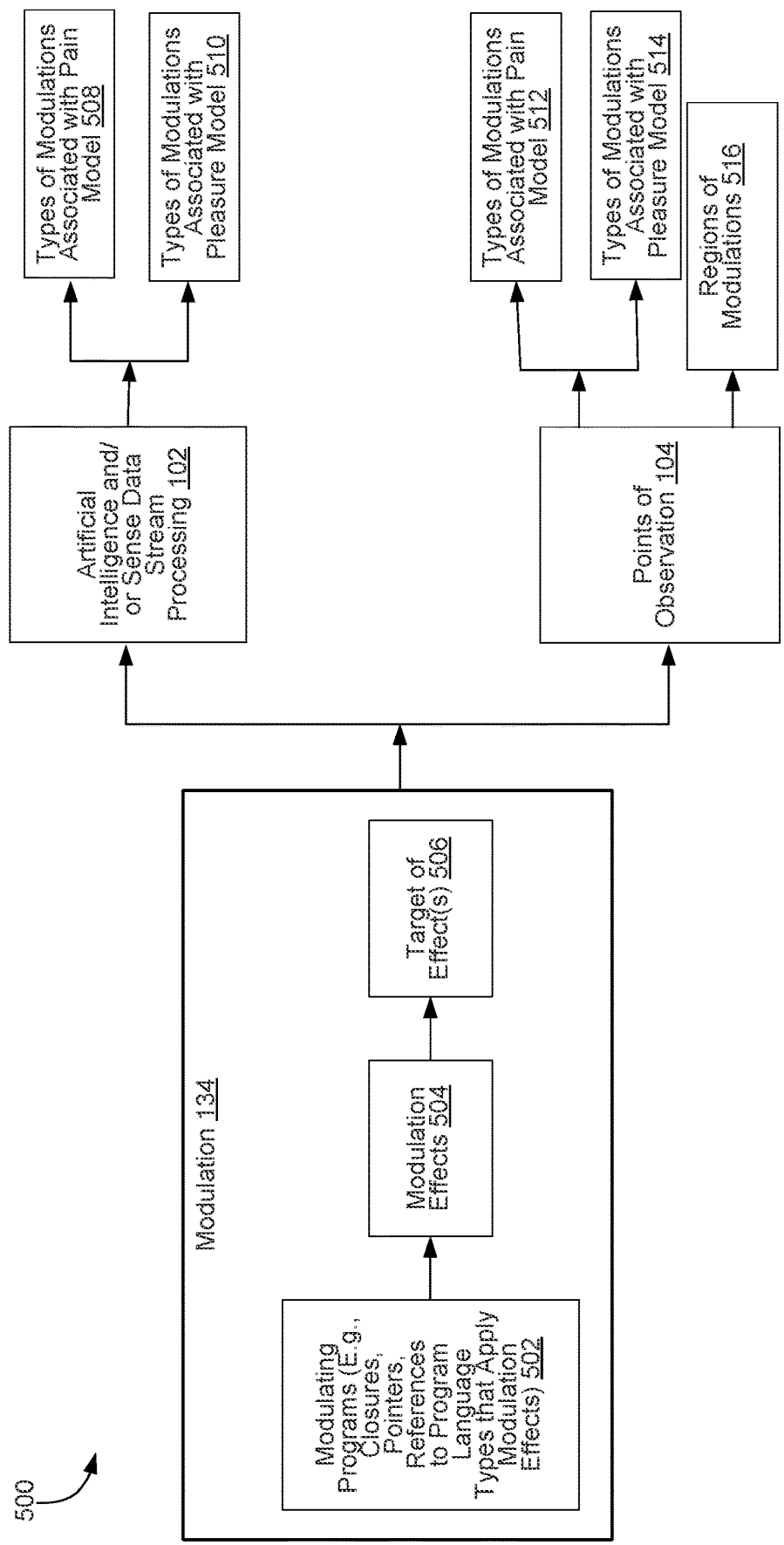
FIG. 5 illustrates example modulation effects, in accordance with some implementations.

FIG. 5 illustrates example modulation effects 500, in accordance with some implementations. Some implementations use a pain and/or pleasure model for amplifying, attenuating, and/or suppressing body related perceptions. To illustrate, suppose a human (or the virtual body) is pricked by a pin. The pain prick will cause pain. In this case, the pain stimulus is localized (to the region of the pin prick). Pain therefore can be caused by a small number of nerves in a very localized part of the body. Pain suppresses or attenuates other body related perceptions, typically suppressing sense data from or along main nerves or possibly in the brain. In simple organisms, the pain may only suppress other nearby nerves. Suppressing sense data suppresses perceptions, while amplifying the pain perception at the same time. On the other hand, pleasure amplifies, expands, increases body related perceptions, turns up perceptive awareness related to the body. Some implementations model pleasure caused by seeing an object or a characteristic of an object. For example, some implementations model a visual effect or pleasure caused by seeing a color (e.g., green) in a scene (i.e., the virtual environment).

In some implementations, the modulations 134 include modulating programs 502 (e.g., closures, pointers, references to program language types or compositions of types that are instantiated and executed) that apply modulation effects 504 at target of effects 506. Example target of effects 506 include the AI and/or sense data stream processing 102, and the points of observation 104, according to some implementations. The AI and/or sense data stream processing 102 are associated with types of modulations associated with a pain model 508, and/or types of modulations associated with a pleasure model 510. Similarly, the points of observation 104 are associated with types of modulations associated with a pain model 512, and/or types of modulations associated with a pleasure model 514, according to some implementations. The points of observation 104 are also associated with regions of modulations (e.g., points of observation corresponding to the virtual being 110, objects and other virtual being 112, and non-objects 114).

Example Pain and Pleasure Models

This Section describes example pain and pleasure models, according to some implementations. In the description that follows, example times are specified using real-time seconds (or wall clock time). If the simulation is run slower or faster than real-time, then the example times need to be adjusted accordingly.

In the description that follows, size of the virtual being, ratios of body part sizes, and dimensions generally correspond to real world being equivalents. Parameters specified are assumed to be tunable for a given simulation. Sensory type is assumed to be a label that is descriptive of the virtual medium interaction. For the sake of illustration, deformation assumes a movement of sensory and sensory locations in a direction normal to the baseline location. It is further assumed that the baseline location is a manifold or shape.

In some implementations, pleasure is a reward that has one or more causes and one or more effects. An example cause for pleasure is, in accordance with interactions between sensors in sensory locations on a virtual being, and sense properties in sense locations on the same virtual being or another virtual being or object, where sensory type of both sensors and sense properties is light touch, where if the sensory locations and sense locations are on the same virtual being then they do not interact when they are in the same location or overlap. If the sensory locations and sense locations are not on the same virtual being, then interaction will occur even if they are the same location or overlap. A deformation to the sensory locations is in a range of 1 nanometer to 5 millimeters in a direction normal to the sensory location's non deformed baseline location within time periods of 1/50th of a second to 1 second, activates a corresponding pleasure effect. In some implementations, the corresponding pleasure effect is to attenuate up by 1 percent to 200 percent, as determined by the artificial neural networks, resolution of the sensors in the current set of pleasure cause activated sensory locations, and/or to attenuate up by 1 percent to 200 percent the resolution of the sensors in other non-pleasure cause activated sensory locations.

Another example cause for pleasure is, in accordance with interactions between sensors in sensory locations on a virtual being, and sense properties in sense locations on the same virtual being or another virtual being or object, where sensory type of both sensors and sense properties is temperature, if the sensory locations and sense locations are on the same virtual being, then they do not interact when they are in the same location or overlap. If the sensory locations and sense locations are not on the same virtual being, then interaction will occur even if they are the same location or overlap. In some implementations, when distance between sensory locations and sense locations is less than 1 foot, then the interactions may activate a pleasure effect according to the following table:

| Temperature range | Distance | Deformation normal to the sensory location's non deformed | Temperature's pleasure effect |
|---|---|---|---|
| 0-130 | Less than 1 ft. | 0.0 mm | None |
| 90-100 | Less than 1 ft. | 0.0 mm | For each degree in the range above 90, attenuate up by 0.05 percent the resolution of the sensors in the current set of pleasure cause activated sensory locations |
| 90-100 | Less than 1 ft. | 1.0 nm-5.0 mm | For each degree in the range above 90, attenuate up by (20.0 percent times deformation/5.0 mm) the resolution of the sensors in the current set of pleasure cause activated sensory locations |

Another example cause for pleasure is, in accordance with interactions between sensors in sensory locations on a virtual being and sense properties in sense locations on the same virtual being or another virtual being or object, where sensory type of both sensors and sense properties is vibration, where if the sensory locations and sense locations are on the same virtual being, then they do not interact when they are in the same location or overlap. If the sensory locations and sense locations are not on the same virtual being, then interaction will occur even if they are the same location or overlap, where the calculated vibration frequency of the manifold region of the sensory locations more than 0.5 Hertz (Hz), activates a corresponding pleasure effect. In some implementations, the corresponding vibration pleasure effect is to attenuate up by a percentage time the resolution of all the sensors of all sensory type in the virtual being's vibration affected sensory locations to a maximum of 10 percent in 10 minutes after which there is no further pleasure effect for 1 hour, according to their respective calculated vibration frequency of the manifold region, according to a formula $x=f^{1.1}+1$ for every 10 seconds the vibration presents, where f=frequency.

In contrast to pleasure, pain is an anti-reward that has causes and corresponding effects, examples of which are provided below for illustration, according to some implementations. An example cause for pain is when a pleasure activation of (e.g., activation of sensory type light touch) does not occur within a virtual being within a time period (e.g., 30 seconds), then the pleasure effect activates a pain effect. An example pain effect is to attenuate down by 1 percent the resolution of all the sensors in the virtual being where sensory type is light touch, according to some implementations.

Another example cause for pain is, in accordance with interactions between sensors in sensory locations on a virtual being and sense properties in sense locations on the same virtual being or another virtual being or object, where sensory type of both sensors and sense properties is pressure, where if the sensory locations and sense locations are on the same virtual being, then they do not interact when they are in the same location or overlap. On the other hand, if the sensory locations and sense locations are not on the same virtual being, then interaction occur even if they are the same location or overlap. Similarly, when deformation to the sensory locations is in a range of distance (e.g., 6 millimeters or greater) in a direction normal to the sensory location's non deformed baseline location within predetermined time periods (e.g., 1/60th of a second up to 10 seconds), interaction activates a corresponding pain effect. For example, the pain effect is to attenuate down by 4 percent for every 1 millimeter of deformation between 6 millimeters and 16 millimeters, and 6 percent for every 1 millimeter of deformation between 16 and 26 millimeters, the resolution of the sensors in the virtual being with sensory type light touch and pressure that are within the pain activated sensory locations, for period of 5 minutes. In some implementations, if the resolution of any of the sensors ever becomes 0, then they are removed from the virtual being.

Another example cause for pain is, in accordance with interactions between sensors in sensory locations on a virtual being and sense properties in sense locations on the same virtual being or another virtual being or object, where sensory type of both sensors and sense properties is temperature, where if the sensory locations and sense locations are on the same virtual being, then they do not interact when they are in the same location or overlap. On the other hand, if the sensory locations and sense locations are not on the same virtual being, then interactions occur even if they are the same location or overlap, and the interactions may activate a corresponding pain effect according to the following table:

| Temperature range | Distance | Deformation normal to the sensory location's non deformed baseline | Temperature's pain effect. |
|---|---|---|---|
| 50-130 | Less than 1 ft. | 0.0 mm | None |
| 131 and above or below 50. | Less than 1 ft. | 0.0 mm | For each degree in the range above 131 or below 50, attenuate down by 0.33 percent the resolution of the sensors in the current set of pain cause activated sensory locations |
| 131 and above or below 50. | Less than 1 ft. | 1.0 nm- 5.0 mm | For each degree in the range above 131 or below 50, attenuate down by (1.0 percent * deformation/5.0 mm) the resolution of the sensors in the current set of pain cause activated sensory locations |

Another example cause for pain is, in accordance with interactions between sensors in sensory locations on a virtual being and sense properties in sense locations on the same virtual being and same manifold, where sensory type of both sensors and sense properties is stretch or compress. In order to interact, the sensory locations and sense locations must be part of the same virtual being and not have the same baseline location or have overlapping baseline locations. When the sensory locations and sense locations' respective baseline location closest edge points lie within a predetermined distance (e.g., 2 mm) apart, along a closest path between them on a defined manifold which each are on, then the interactions may activate a corresponding pain effect according to the following table:

| Sensory location's and sense location's baseline location closest edge points distance apart (as calculated along a closest path between them on a defined manifold which each are on) (sensory type = stretch or compress, manifold is typically the outer manifold of the virtual being) | Pain effect |
|---|---|
| 2.0 mm or greater apart. | None |
| Less than 2.0 mm apart. | For each 0.05 mm increase or decrease from the baseline closest path distance, attenuate down by 1 percent the resolution of the sensors of all sense types in the current set of stretch or compress pain cause activated sensory locations. |

Another example cause for pain is, in accordance with interactions between sensors in sensory locations on a virtual being and sense properties in sense locations on the same virtual being or another virtual being or object, where sensory type of both sensors and sense properties is vibration, where if the sensory locations and sense locations are on the same virtual being, then they do not interact when they are in the same location or overlap. If the sensory locations and sense locations are not on the same virtual being, then interaction will occur even if they are the same location or overlap if the calculated vibration frequency of the manifold region of the sensory locations is more than a predetermined frequency (e.g., 0.5 Hz), and activates a corresponding pain effect. In some implementations, the corresponding pain effect is to attenuate down by a percentage times the resolution of all the sensors of all sensory types in the virtual being's vibration-affected sensory locations according to their respective calculated vibration frequency of the manifold region, according to a formula, where $x=f\hat{\;}1.1$ every 10 seconds the vibration presents, where f=frequency.

Another example cause for pain is, in accordance with interactions between sensors in sensory locations representing the retinas and retina substructures of the virtual being's eyes and sense properties in sense locations on the same virtual being or another virtual being or object, where sensory type of both sensors and sense properties is bright, where sensors are receiving input from one or more respective virtual mediums, where the virtual mediums are virtual cameras that move and change their parameters in accordance with the virtual being's virtualized eye movements, virtualized eye focusing, virtualized eye dilation, and the input to the sensors is the respective rendered frame pixel output from the viewing frustums of the respective virtual cameras, either in raw data form or processed first through artificial neural networks, and where input to sensors only occurs when the sense properties in sense locations of sensory type bright are within the viewing frustums of the virtual cameras, this activates a corresponding pain effect according to the following table:

| Duration activated sensors continuously receive bright input | Bright pain effect |
|---|---|
| 0.0-1.0 second | None |
| 1.01-30.0 | Temporarily attenuate down by 2 percent per second the resolution of the sensors of sensory type "bright" in the activated sensory locations. If the activated sensory locations become inactive attenuate up by 2 percent per second, the previously attenuated down sensors until they again are at their maximum. The maximum can be less than 100 percent of their original resolution if the maximum has been lowered. |
| Above 30.0 seconds | Temporarily attenuate down by 2 percent per second the resolution of the sensors of sensory type "bright" in the activated sensory locations and permanently reduce the maximum resolution by 1 percent per second. If the activated sensory locations become inactive attenuate up by 2 percent per second, the previously attenuated down sensors until they again are at their maximum. The maximum can be less than 100 percent of their original resolution if the maximum has been lowered. |

Another example cause for pain is, in accordance with interactions between sensors in sensory locations representing the virtual ear drum, the attached virtualized malleus, incus, stapes (ossicles), cochlea and cochlea substructures of the virtual being's ears and sense properties in sense locations on the same virtual being or another virtual being or object, where sensory type of both sensors and sense properties is sound, where sense locations with sensory type sound emit sound that is ray traced or path traced in the virtual environment, where sensors are receiving input from one or more respective virtual mediums, where the virtual mediums are sound ray tracing or path traced audio from the sense locations with sensory type sound arriving at the virtual being's virtualized ear drum, where the arriving audio is accordingly modeled to vibrate the eardrum, where the vibration of the eardrum is accordingly modeled to move a virtualized malleus, incus, stapes or substitute that combines all three, where the stapes or substitute sits against a second virtual inner membrane that sits between it and a virtualized fluid in the cochlea, where the inner membrane in contact with the virtual fluid is accordingly modeled to disturb the fluid, where the virtualized fluid is near to or in contact with thousands of virtualized tiny hairs also in the virtual cochlea, where the contact and interaction of the virtual fluid on the hairs is accordingly modeled using a large number of sound samples covering a large range of frequencies and amplitudes and types, where a set of virtual cameras have the hairs within their viewing frustums and capture and render out frame data, where the frame data is fed into a first set of artificial neural networks training them to recognize the features of individual hairs and classify their respective movements in the fluid and tensions according to specific sound frequencies and amplitudes and sound types affecting the fluid, where a second set of artificial neural networks is used to modify and optimize the topology of the virtualized ear components for optimized receiving of the ray or path traced audio, where a third set of artificial neural networks is used to modify and optimize the shape, placement, size and distribution of hairs in the virtual cochlea to optimize their capacity to extract features in the audio by way of their interaction with the fluid, where a fourth set of artificial neural networks is trained on non-ray traced or path-traced audio samples and ray-traced or path-traced audio samples in isolation, where the fourth set of artificial neural networks receives as input newly arriving ray-traced or path-traced audio samples arriving at the eardrum location and its output is used to provide baselines and error feedback when training the first, second and third sets of artificial neural networks separately and in combination, where the outputs from the first set of artificial neural networks is the input to the sensors, interaction activates a corresponding pain effect according to the following table:

| Output from the first set of artificial neural networks corresponds to decibel ranges. | Sound pain effect. |
|---|---|
| 0.0 to 80 decibels | None |
| 80.01 to 130 decibels | Attenuate down by 0.5 percent per second the resolution of the sensors of sensory type "sound" in the activated sensory locations. If the activated sensory locations become inactive attenuate up by 0.5 percent per second the previously attenuated down sensors until they again are at their maximum. The maximum can be less than 100 percent of their original resolution if the maximum has been lowered |
| 130.01 to 150 decibels | Temporarily attenuate down by 1 percent per second the resolution of the sensors of sensory type "sound" in the activated sensory locations and permanently reduce the maximum resolution by 0.1 percent per second. If the activated sensory locations become inactive attenuate up by 1 percent per second the previously attenuated down sensors until they again are at their maximum. The maximum can be less than 100 percent of their original resolution if the maximum has been lowered. |
| Above 150 decibels | Temporarily attenuate down by 2 percent per second the resolution of the sensors of sensory type "sound" in the activated sensory locations and permanently reduce the maximum resolution by 0.2 percent per second. If the activated sensory locations become inactive attenuate up by 2 percent per second the previously attenuated down sensors until they again are at their maximum. The maximum can be less than 100 percent of their original resolution if the maximum has been lowered. |

An alternate example cause for pain is, in accordance with interactions between sensors in sensory locations representing the virtual being's ears and sense properties in sense locations on the same virtual being or another virtual being or object, where sensory type of both sensors and sense properties is sound, where sense locations with sensory type sound emit sound that is ray traced or path traced in the virtual environment, where sensors are receiving input from one or more respective virtual mediums, where the virtual mediums are sound ray tracing or path traced audio from the sense locations with sensory type sound arriving at the virtual being's virtualized ear location, where sensory locations of sensory type sound on the ear location, where the temporal and spatial characteristics of the ray traced or path traced audio arriving at the ear location is mapped to the inputs of the sensory locations of sensory type sound, the interaction activates a respective pain effect according to the following table:

| Decibel ranges of sound ray traced or path traced audio arriving at ear location. | Sound pain effect. |
|---|---|
| 0.0 to 80 decibels | None |
| 80.01 to 130 decibels | Attenuate down by 0.5 percent per second the resolution of the sensors of sensory type "sound" in the activated sensory locations. If the activated sensory locations become inactive attenuate up by 0.5 percent per second the previously attenuated down sensors until they again are at their maximum. The maximum can be less than 100 percent of their original resolution if the maximum has been lowered. |
| 130.01 to 150 decibels | Temporarily attenuate down by 1 percent per second the resolution of the sensors of sensory type "sound" in the activated sensory locations and permanently reduce the maximum resolution by 0.1 percent per second. If the activated sensory locations become inactive attenuate up by 1 percent per second the previously attenuated down sensors until they again are at their maximum. The maximum can be less than 100 percent of their original resolution if the maximum has been lowered. |
| Above 150 decibels | Temporarily attenuate down by 2 percent per second the resolution of the sensors of sensory type "sound" in the activated sensory locations and permanently reduce the maximum resolution by 0.2 percent per second. If the activated sensory locations become inactive attenuate up by 2 percent per second the previously attenuated down sensors until they again are at their maximum. The maximum can be less than 100 percent of their original resolution if the maximum has been lowered. |

| | |
|---|---|
| Decibel ranges of sound ray traced or path traced audio arriving at ear location. | Sound pain effect. |
| | are at their maximum. The maximum can be less than 100 percent of their original resolution if the maximum has been lowered. |

Another example cause for pain is, in accordance with interactions between sensors in sensory locations representing the virtual vestibular canals of the virtual being's ears filled with virtual fluid, and sense properties in sense locations in the virtual fluid or particles comprising or otherwise within the virtual fluid, where sensory type of both sensors and sense properties is balance, where sensors are receiving input from a respective virtual mediums, one for each of the three canals, where the virtual mediums model accordingly the virtual fluid so that it is affected by virtual gravity, where the virtualized fluid is near to or in contact with thousands of virtualized tiny hairs virtual vestibular canals, where a set of virtual cameras have the hairs within their viewing frustums and capture and render out frame data, where the frame data is fed into a first set of artificial neural networks training them to recognize the features of individual hairs and classify their respective movements in the fluid and tensions according to change in orientation of the virtual vestibular canals with respect to the movement of vestibular canals occurring when the virtual being moves and with respect to virtual gravity effects, where a second set of artificial neural networks is used to modify and optimize the shape, placement, size and distribution of hairs in the virtual vestibular canals to optimize their capacity to extract positional features by way of their interaction with the fluid, where actual positional data from the virtual environment engine is used to provide baselines and error feedback when training the first and second sets of artificial neural networks, where the outputs from the first set of artificial neural networks is the input to the sensors, the interactions activates a respective pain effect according to the following table:

| | |
|---|---|
| Continuous rotational spinning | Balance pain effect. |
| 0 to 1 rotations in 5 seconds | None |
| Greater than 1 rotation every 5 seconds | Attenuate down by 2 percent per second the resolution of the sensors of sensory type "balance" in the activated sensory locations. If the activated sensory locations become inactive attenuate up by 2 percent per second the previously attenuated down sensors until they again are at their maximum. Store the most recent 10 seconds of input to the activated sensors, if spinning has occurred for more than 10 seconds and decreases at a rate of greater than double the rate of increase, replay the most recent stored 10 seconds of input as new input to the activated sensors. |

In some implementations, the pain model 508 for the AI programs include performing one or more operations that include:
temporarily or permanently reducing speed of computation by adding delay or reducing clock rate, swapping out an algorithm implementation for a less efficient implementation, reducing threads, reducing processes, and reducing computational resources and/or memory resources;
temporarily or permanently reducing accuracy of computation and associated data;
temporarily or permanently removing or changing machine learning model parameters, optimizer hyper-parameters, and model specific hyper-parameters;
temporarily or permanently removing or changing values stored in memory for instances of programming language types;
temporarily or permanently removing neural nets or layers of a neural nets; and/or
temporarily or permanently removing neural net connections.

In some implementations, the pleasure model 510 for the AI programs include performing one or more operations that include:
temporarily or permanently increasing speed of computation by removing a delay or increasing clock rate, swapping out an algorithm implementation for a more efficient implementation, increasing threads, increasing processes, and increasing computational, and/or memory resources;
temporarily or permanently increasing accuracy of computation and associated data;
temporarily or permanently adding or changing machine learning model parameters, optimizer hyper-parameters, and model specific hyper-parameters;
temporarily or permanently adding new or re-adding previously removed or omitted values stored in memory for instances of programming language types;
temporarily or permanently adding or re-adding neural nets or layers of neural nets; and
temporarily or permanently re-adding neural net connections.

In some implementations, the pain model 508 for programs that operate on type streams include performing one or more operations that include:
temporarily or permanently reducing speed of computation by adding delay or reducing clock rate, swapping out an algorithm implementation for a less efficient implementation, reducing threads, reducing processes, and reducing computational resources, memory resources, and/or queue or buffer depth;
removing values or instances of a program language from the one or more type streams; and
temporarily or permanently reducing select programs or operations being applied to the one or more type streams.

In some implementations, the pleasure model 510 for the programs that operate on type streams include:
temporarily or permanently increasing speed of computation by removing a delay or increasing clock rate, swapping out an algorithm implementation for a more efficient implementation, increasing threads, increasing processes, and increasing computational resources, memory resources, and/or queue or buffer depth; and
temporarily or permanently adding or re-adding select programs or operations applied to the one or more type streams.

In some implementations, the pain model 512 for the points of observation 104 include performing one or more operations that include:

temporarily or permanently attenuating lower dynamic range and/or resolution of the one or more points of observation for the one or more sense properties with matching type descriptors;

temporarily or permanently attenuating lower the dynamic range and/or resolution of the one or more points of observation having type descriptors matching those of the one or more sense properties. In some implementations, the modulation effect can be specified for and/or affect the one or more points of observation in one or more sensory locations; and temporarily or permanently attenuating lower the dynamic range and/or resolution of the one or more points of observation having type descriptors matching and also not matching that of the medium of observation for one single sensory type that is imposing a pain effect. In some implementations, the modulation effect can be specified for and/or affect the one or more points of observation in one or more sensory locations. In some implementations, the medium of observation may be for more than one sense property sensory type and matching or not matching sensor sensory types.

In some implementations, the pleasure model 514 for the points of observation 104 include performing one or more operations that include:

temporarily or permanently attenuating higher dynamic range and/or resolution of the one or more points of observation for the one or more sense properties with matching type descriptors; and temporarily or permanently attenuating higher the dynamic range and/or resolution of the one or more points of observation having type descriptors matching those of the one or more sense properties. In some implementations, the modulation effect can be specified for and/or affect the one or more points of observation in one or more sensory location; and temporarily or permanently attenuating higher the dynamic range and/or resolution of the one or more points of observation having type descriptors matching and also not matching that of the medium of observation for one single sensory type that is creating a pleasure effect. In some implementations, the modulation effect can be specified for and/or affect the one or more points of observation in one or more sensory locations. In some implementations, the medium of observation may be for more than one sense property sensory type and matching or not matching sensor sensory types.

Figure 6:
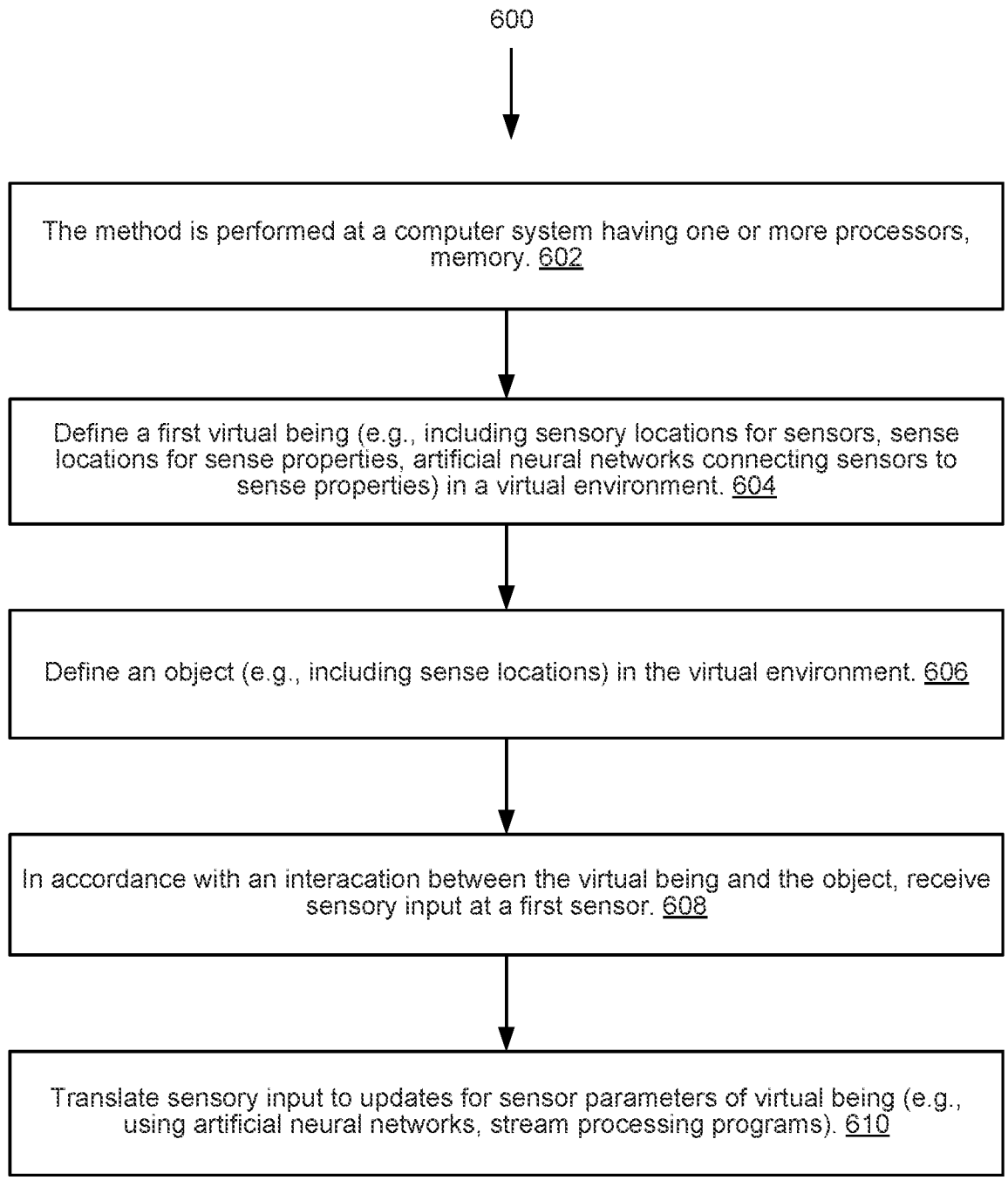
FIG. 6 provides a flowchart of a process for simulating sense data, according to some implementations.

FIG. 6 provides a flowchart of a process 600 for simulating sense data for virtual beings in virtual environments, according to some implementations. The method is performed (602) at a computer system (e.g., the computing device 200) having one or more processors (e.g., the processors 202), memory (e.g., the memory 210), and one or more programs stored in the memory and configured for execution by the one or more processors. The one or more programs include instructions for performing the method.

The method includes defining (604) a first virtual being (e.g., the virtual being 110) in a virtual environment (e.g., the virtual environment 220). The first virtual being includes a plurality of sensory locations. Each sensory location has one or more sensors. Each sensor has a respective sensory type and is configured to receive sensory input by one or more respective virtual mediums having the respective sensory type. The first virtual being also includes a plurality of sense locations, each sense location storing a respective set of one or more sense properties, each sense property having a respective sensory type. The first virtual being also includes a plurality of artificial neural networks connecting sensors at the plurality of sensory locations. Each of the artificial neural networks can be implemented in a variety of ways, such as a simple neural network, a recurrent neural network, a bidirectional recurrent neural network, a convolutional neural network, a deep convolutional neural network, or one of many other known types of neural networks. An artificial neural network may also be implemented using other machine learning algorithms, such as a support vector machine, a random forest of decision trees, linear regression, logistic regression, naïve Bayes, kNN, or K-Means.

In some implementations, the method includes defining the sensors and sense properties and of respective types, and/or placing the sensors in the sensory locations and sense locations, thereby defining spatial coordinates (sometimes referred to as world coordinate space or local coordinate space, by different game engines or tools) in a 3D space. In some implementations, as the first virtual being moves, coordinates are updated dynamically, and/or the virtual being's body is deformed according to movement and/or interactions.

The method also includes defining (606) an object (e.g., an object of the one or more objects or other virtual beings 112) in the virtual environment. The object has a plurality of sense locations, each sense location storing a respective set of one or more sense properties, each sense property having a respective sensory type. It is noted that the object 118 may include objects and other virtual beings (distinct from the virtual being), according to some implementations.

The method also includes, in accordance with an interaction between the virtual being and the object, receiving (608) sensory input at a first sensor at a first sensory location using a first virtual medium according to a first sense property of the object at a first sense location. The first sensor, the first virtual medium, and the first sense property have a same sensory type. It is noted that, in some implementations, the first virtual medium determines the interaction between sense properties and sensors.

The method also includes, in accordance with the received sensory input, using a first artificial neural network to translate (610) the received sensory input into (i) updates to one or more configuration parameters of sensors of the first virtual being and/or (ii) movement of the virtual being. The artificial neural network or the virtual medium or combination can update the configuration parameters (e.g. resolution or pruning of sensors when their resolution or max resolution goes to 0 in for some sensory types where it is a permanent pain effect that we want. The artificial neural network also can also be responsible for actuating the movement of the being.

Suppose the sensory type is heat. There may be, at a given location on the virtual being, both heat sensors as well as heat sense properties (e.g., a human arm can sense heat, but it is also at some temperature itself). As a ball approaches, the sensors can detect the heat, but the heat from the ball will also affect the heat sense properties of the being (e.g., raising or lowering the temperature of the virtual being at the point of contact). In addition, under the pain/pleasure model, the sensors can provide input into the neural networks to modify sensitivity or other parameters of nearby sensors. In some implementations, the updates include attenuations to parameters like resolution, trained artificial neural network or machine learning model parameters, and/or algorithmic parameters. In some implementations, the virtual being interacts with itself or another virtual being. In some implementations, the object is a portion of the virtual being, and the virtual being interacts with a portion of itself. For example, the virtual being can touch itself thousands of times per day, and in doing so, feel its own body. To further illustrate, similar to a human, the virtual being can lightly touch, rub, stroke, press, or scratch any part of its body using fingers, touch a tongue to an arm or lick lips, suck a thumb, or run fingers through hair.

In some implementations, the method further includes: selecting enhancements or impairments to apply to the first sensory location and/or the first artificial neural network based on (i) the first sensory location and the first sense location, and (ii) the sensory type of the first sensor, the first virtual medium, and the first sense property; and altering, based on the enhancements or impairments, (i) one or more configuration parameters of the first sensor, thereby modifying its ability to receive sensory input, and/or (ii) one or more configuration parameters of the first artificial neural network, thereby modifying its ability to process sense properties. Some implementations select a modulation or attenuation effect, and the selection is based on tangible results about the interaction.

In some implementations, in accordance with a determination that the sensory type is light touch, selecting the enhancements or impairments is further based on determining whether the first sensory location is deformed by a predetermined amount in a direction normal to the first sensory location's non-deformed baseline location, within a predetermined time period.

In some implementations, altering the one or more configuration parameters of the first sensor includes enhancing the ability of the first sensor to receive sensory input at the first sensory location by increasing resolution of the first sensor by a predetermined amount.

In some implementations, the method further includes: in accordance with a determination that the sensory type is temperature, selecting the enhancements or impairments further based on determining whether a distance between the first sensory location and the first sense location is less than a predetermined amount in a direction normal to the first sensory location's non-deformed baseline location.

In some implementations, altering the one or more configuration parameters of the first sensor includes enhancing the ability of one or more sensors to receive sensory input, at or near the first sensory location, by increasing resolution of the first sensor by a first predetermined amount for each degree of temperature, as sensed by the first sensor, above a predetermined minimum temperature up to a predetermined maximum temperature.

In some implementations, selecting the enhancements or impairments is further based on determining if the first sensory location is deformed by a predetermined amount in a direction normal to the first sensory location's non-deformed baseline location.

In some implementations, altering the one or more configuration parameters of the first sensor includes enhancing the ability of one or more sensors to receive sensory input, at or near the first sensory location, by increasing resolution of the first sensor by a second predetermined amount for each degree of temperature, as sensed by the first sensor, above a predetermined minimum temperature up to a predetermined maximum temperature.

In some implementations, the method further includes: after altering the one or more configuration parameters of the first sensor and/or the one or more configuration parameters of the first artificial neural network: in accordance with a determination that the ability of the first sensor to receive sensory input, and/or the ability of the first artificial neural network to sense properties has not changed within a predetermined time period, impairing the ability of one or more sensors to receive sensory input by decreasing resolution of the first sensor by a predetermined amount. The one or more sensors correspond to sensory locations with a sensory type of light touch.

In some implementations, in accordance with a determination that the sensory type is pressure, selecting the enhancements or impairments is further based on determining whether the first sensory location is deformed by greater than a predetermined amount in a direction normal to the first sensory location's non-deformed baseline location, within a predetermined time period.

In some implementations, altering the one or more configuration parameters of the first sensor includes impairing the ability of the first sensor to receive sensory input at the first sensory location by decreasing resolution of one or more sensors, at or near the first sensory, for a predetermined time period. The one or more sensors correspond to sensory locations with a sensory type of light touch or pressure.

In some implementations, the method further includes, in accordance with a determination that resolution of a subset of sensors of the one or more sensors equals 0, or has a maximum resolution parameter equal to 0, removing the subset of sensors from the first virtual being.

In some implementations, in accordance with a determination that the sensory type is temperature, selecting the enhancements or impairments is further based on determining whether a distance between the first sensory location and the first sense location is less than a predetermined amount in a direction normal to the first sensory location's non-deformed baseline location.

In some implementations, altering the one or more configuration parameters of the first sensor includes impairing the ability of one or more sensors to receive sensory input, at or near the first sensory location, by decreasing resolution of the first sensor by a second predetermined amount for each degree of temperature, as sensed by the first sensor, above a first predetermined minimum temperature or below a second predetermined maximum temperature.

In some implementations, in accordance with a determination that the sensory type is temperature, selecting the enhancements or impairments is further based on determining whether the first sensory location is deformed by a predetermined amount in a direction normal to the first sensory location's non-deformed baseline location.

In some implementations, altering the one or more configuration parameters of the first sensor includes impairing the ability of one or more sensors to receive sensory input, at or near the first sensory location, by decreasing resolution of the first sensor by a third predetermined amount for each degree of temperature, as sensed by the first sensor, above a predetermined minimum temperature or below a fourth predetermined maximum temperature.

In some implementations, the method further includes displaying the first virtual being on one or more displays of the computer system.

In some implementations, the object is a second virtual being, distinct from the first virtual being.

In some implementations, each sensory location is a point, a one-dimensional segment, a two dimensional area, or a three dimensional region.

In some implementations, each sensory location is an n-dimensional manifold in the virtual environment, with n=0, 1, 2, or 3.

In some implementations, each sense location is an n-dimensional manifold in the virtual environment, with n=0, 1, 2, or 3.

In some implementations, each sensory location corresponds to a respective region, surface, or point, on or within the first virtual being.

In some implementations, the plurality of sensory locations are dynamically generated and associated with specific points and/or areas on the first virtual being when a surface topology of the first virtual being is changing. In some implementations, the sensory locations change because the surface topology is changing, but the sensors will remain the same (e.g., similar to a nerve in a human skin). Some implementations use a model where, as a reward, new sensory locations (or sensory points) are added. In some implementations, number of sensors do not increase, although it may decrease because some sensors are removed. In some implementations, location of sensors in space may change, but location of the sensors on the manifold remain constant. For example, when a skin gets pressed, the location of the nerves in the space may change, but the skin's manifold relative positions and that of the nerves remain constant.

In some implementations, the sensory type includes one or more of: temperature, light touch, pressure, vibration, stretch/compress, sound, and bright.

In some implementations, the method further includes: providing one or more Application Programming Interface (API) calls to update the plurality of sensory locations; and, in response to receiving a call to the one or more Application Programming Interface (API) calls, performing one or more operations selected from the group consisting of: creating, writing, reading, modifying, moving, and/or deleting a sensory location.

In some implementations, the first virtual being comprises a virtual approximation of a body of human, an animal, an insect, a humanoid, or a creature.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of simulating sense data for virtual beings in virtual environments, performed at a computer system having one or more processors, memory, and one or more programs stored in the memory and configured for execution by the one or more processors, the one or more programs comprising instructions for:
    defining a first virtual being in a virtual environment, wherein the first virtual being includes:
        a plurality of virtual sensory locations, each virtual sensory location having one or more virtual sensors, wherein each virtual sensor has a respective sensory type and is configured to receive sensory input by one or more respective virtual mediums having the respective sensory type;
        a plurality of virtual sense property locations, each virtual sense property location associated with a respective set of one or more sense properties, each sense property having a respective sensory type; and
        a plurality of artificial neural networks processing output from virtual sensors at the plurality of virtual sensory locations;
    defining a virtual object in the virtual environment, wherein the virtual object has a plurality of virtual sense property locations, each virtual sense property location associated with a respective set of one or more sense properties, each sense property having a respective sensory type;
    in accordance with an interaction between the virtual being and the virtual object, receiving sensory input at a first virtual sensor at a first virtual sensory location using a first virtual medium according to a first sense property of the virtual object at a first virtual sense property location, wherein the first virtual sensor, the first virtual medium, and the first sense property have a same sensory type; and
    in accordance with the received sensory input, using a first artificial neural network to translate the received sensory input into (i) updates to one or more configuration parameters corresponding to resolution and/or dynamic range of virtual sensors of the first virtual being and/or (ii) movement of the virtual being, wherein the one or more configuration parameters corresponding to the resolution and/or dynamic range include one or more hyper-parameters of the first artificial neural network, and updating the hyper-parameters modifies ability of the first virtual sensor and/or the first artificial neural network to process sensory input from the first virtual medium when there is an interaction with the first virtual sensor using the first sense property.

2. The method of claim 1, further comprising:
    selecting changes to configuration parameters to apply to the first virtual sensory location and/or the first artificial neural network based on (i) the first virtual sensory location and the first virtual sense property location, and (ii) the sensory type of the first virtual sensor, the first virtual medium, and the first sense property; and
    altering, based on the selected changes to configuration parameters, (i) one or more configuration parameters of the first virtual sensor, thereby modifying its ability to receive sensory input, and/or (ii) one or more configuration parameters of the first artificial neural network, thereby modifying ability of the first virtual sensor and/or the first artificial neural network to process sensory input from the first virtual medium that determines when there is an interaction with the first virtual sensor using the first sense property.

3. The method of claim 2, wherein:
    in accordance with a determination that the sensory type is light touch, selecting the changes to configuration parameters is further based on determining whether the first virtual sensory location is deformed by a predetermined amount in a direction normal to the first virtual sensory location's non-deformed baseline location, within a predetermined time period.

4. The method of claim 3, wherein:
altering the one or more configuration parameters of the first virtual sensor comprises enhancing the ability of the first virtual sensor to receive sensory input at the first virtual sensory location by increasing resolution of the first virtual sensor by a predetermined amount.

5. The method of claim 2, wherein:
in accordance with a determination that the sensory type is temperature, selecting the changes to configuration parameters is further based on determining whether a distance between the first virtual sensory location and the first virtual sense property location is less than a predetermined amount in a direction normal to the first virtual sensory location's non-deformed baseline location.

6. The method of claim 5, wherein:
altering the one or more configuration parameters of the first virtual sensor comprises enhancing the ability of one or more virtual sensors to receive sensory input, at or near the first virtual sensory location, by increasing resolution of the first virtual sensor by a first predetermined amount for each degree of temperature, as sensed by the first virtual sensor, above a predetermined minimum temperature up to a predetermined maximum temperature.

7. The method of claim 5, wherein:
selecting the changes to configuration parameters is further based on determining if the first virtual sensory location is deformed by a predetermined amount in a direction normal to the first virtual sensory location's non-deformed baseline location.

8. The method of claim 7, wherein:
altering the one or more configuration parameters of the first virtual sensor comprises enhancing the ability of one or more virtual sensors to receive sensory input, at or near the first virtual sensory location, by increasing resolution of the first virtual sensor by a second predetermined amount for each degree of temperature, as sensed by the first virtual sensor, above a predetermined minimum temperature up to a predetermined maximum temperature.

9. The method of claim 2, further comprising:
after altering the one or more configuration parameters of the first virtual sensor and/or the one or more configuration parameters of the first artificial neural network:
in accordance with a determination that the ability of the first virtual sensor to receive sensory input, and/or the ability of the first artificial neural network to sense properties has not changed within a predetermined time period, impairing the ability of one or more virtual sensors to receive sensory input by decreasing resolution of the first virtual sensor by a predetermined amount, wherein the one or more virtual sensors correspond to virtual sensory locations with a sensory type of light touch.

10. The method of claim 2, wherein:
in accordance with a determination that the sensory type is pressure, selecting the changes to configuration parameters is further based on determining whether the first sensory location is deformed by greater than a predetermined amount in a direction normal to the first virtual sensory location's non-deformed baseline location, within a predetermined time period.

11. The method of claim 10, wherein:
altering the one or more configuration parameters of the first virtual sensor comprises impairing the ability of the first virtual sensor to receive sensory input at the first virtual sensory location by decreasing resolution of one or more virtual sensors, at or near the first virtual sensory location, for a predetermined time period, wherein the one or more virtual sensors correspond to virtual sensory locations with a sensory type of light touch or pressure.

12. The method of claim 1, further comprising:
in accordance with a determination that resolution of a subset of virtual sensors of the one or more virtual sensors equals 0, removing the subset of virtual sensors from the first virtual being.

13. The method of claim 5, wherein:
altering the one or more configuration parameters of the first virtual sensor comprises impairing the ability of one or more virtual sensors to receive sensory input, at or near the first virtual sensory location, by decreasing resolution of the first virtual sensor by a second predetermined amount for each degree of temperature, as sensed by the first virtual sensor, above a predetermined minimum temperature or below a predetermined maximum temperature.

14. The method of claim 7, wherein:
altering the one or more configuration parameters of the first virtual sensor comprises impairing the ability of one or more virtual sensors to receive sensory input, at or near the first virtual sensory location, by decreasing resolution of the first virtual sensor by a third predetermined amount for each degree of temperature, as sensed by the first virtual sensor, above a predetermined minimum temperature or below a predetermined maximum temperature.

15. The method of claim 2, wherein:
in accordance with a determination that the sensory type is sound, selecting the changes to configuration parameters is further based on determining whether a decibel range of virtual sound arriving at the first virtual sensory location is within a predetermined range; and
in accordance with a determination that the sensory type is bright, selecting the changes to configuration parameters is further based on determining whether a duration for which the first virtual sensory location receives bright input is within a first predetermined time period.

16. The method of claim 15, wherein:
altering the one or more configuration parameters of the first virtual sensor comprises:
impairing the ability of the first virtual sensor to receive sensory input at the first virtual sensory location by decreasing resolution of one or more virtual sensors, at or near the first virtual sensory location, at a predetermined rate, for a second predetermined time period, wherein the one or more virtual sensors correspond to virtual sensory locations with a sensory type of sound or bright; and
in accordance with a determination that the one or more virtual sensors have become inactive, after the second predetermined time period, increasing the resolution of the one or more virtual sensors until the resolution reaches a predetermined maximum resolution.

17. The method of claim 1, further comprising displaying the first virtual being on one or more displays of the computer system.

18. The method of claim 1, wherein the virtual object is a second virtual being, distinct from the first virtual being.

19. The method of claim 1, wherein each virtual sensory location is a point, a one-dimensional segment, a two-dimensional area, or a three-dimensional region.

20. The method of claim 1, wherein each virtual sensory location is an n-dimensional manifold in the virtual environment, with n=0, 1, 2, or 3.

21. The method of claim 1, wherein each virtual sense property location is an n-dimensional manifold in the virtual environment, with n=0, 1, 2, or 3.

22. The method of claim 1, wherein each virtual sensory location corresponds to a respective region, surface, or point, on or within the first virtual being.

23. The method of claim 1, wherein the plurality of virtual sensory locations are dynamically generated and associated with specific points and/or areas on the first virtual being when a surface topology of the first virtual being is changing.

24. The method of claim 1, wherein the sensory type includes one or more of: temperature, light touch, pressure, vibration, stretch/compress, sound, taste, and bright.

25. The method of claim 1, further comprising:
providing one or more Application Programming Interface (API) functions to update the plurality of virtual sensory locations; and
in response to receiving a call to the one or more Application Programming Interface (API) functions, performing one or more operations selected from the group consisting of: creating, writing, reading, modifying, moving, and/or deleting a virtual sensory location.

26. The method of claim 1, wherein the first virtual being comprises a virtual approximation of a body of human, an animal, an insect, a humanoid, or a creature.

27. A virtual reality system for simulating sense data for virtual beings in virtual environments, the system comprising:
one or more processors;
memory; and
one or more programs stored in the memory and configured for execution by the one or more processors, the one or more programs comprising instructions for:
defining a first virtual being in a virtual environment, wherein the first virtual being includes:
a plurality of virtual sensory locations, each virtual sensory location having one or more virtual sensors, wherein each virtual sensor has a respective sensory type and is configured to receive sensory input by one or more respective virtual mediums having the respective sensory type;
a plurality of virtual sense property locations, each virtual sense property location associated with a respective set of one or more sense properties, each sense property having a respective sensory type; and
a plurality of artificial neural networks processing output from virtual sensors at the plurality of virtual sensory locations;
defining a virtual object in the virtual environment, wherein the virtual object has a plurality of sense property locations, each sense property location associated with a respective set of one or more sense properties, each sense property having a respective sensory type;
in accordance with an interaction between the virtual being and the virtual object, receiving sensory input at a first virtual sensor at a first virtual sensory location using a first virtual medium according to a first sense property of the virtual object at a first virtual sense property location, wherein the first virtual sensor, the first virtual medium, and the first sense property have a same sensory type; and
in accordance with the received sensory input, using a first artificial neural network to translate the received sensory input into (i) updates to one or more configuration parameters corresponding to resolution and/or dynamic range of virtual sensors of the first virtual being and/or (ii) movement of the virtual being, wherein the one or more configuration parameters corresponding to the resolution and/or dynamic range include one or more hyper-parameters of the first artificial neural network, and updating the hyper-parameters modifies ability of the first virtual sensor and/or the first artificial neural network to process sensory input from the first virtual medium when there is an interaction with the first virtual sensor using the first sense property.

28. A non-transitory computer-readable storage medium storing one or more programs configured for execution by a computer system having one or more processors and memory, the one or more programs comprising instructions for:
defining a first virtual being in a virtual environment, wherein the first virtual being includes:
a plurality of virtual sensory locations, each virtual sensory location having one or more virtual sensors, wherein each virtual sensor has a respective sensory type and is configured to receive sensory input by one or more respective virtual mediums having the respective sensory type;
a plurality of virtual sense property locations, each virtual sense property location associated with a respective set of one or more sense properties, each sense property having a respective sensory type; and
a plurality of artificial neural networks processing output from virtual sensors at the plurality of virtual sensory locations;
defining a virtual object in the virtual environment, wherein the virtual object has a plurality of virtual sense property locations, each virtual sense property location associated with a respective set of one or more sense properties, each sense property having a respective sensory type;
in accordance with an interaction between the virtual being and the virtual object, receiving sensory input at a first virtual sensor at a first virtual sensory location using a first virtual medium according to a first sense property of the virtual object at a first virtual sense property location, wherein the first virtual sensor, the first virtual medium, and the first sense property have a same sensory type; and
in accordance with the received sensory input, using a first artificial neural network to translate the received sensory input into (i) updates to one or more configuration parameters corresponding to resolution and/or dynamic range of virtual sensors of the first virtual being and/or (ii) movement of the virtual being, wherein the one or more configuration parameters corresponding to the resolution and/or dynamic range include one or more hyper-parameters of the first artificial neural network, and updating the hyper-parameters modifies ability of the first virtual sensor and/or the first artificial neural network to process sensory input from the first virtual medium when there is an interaction with the first virtual sensor using the first sense property.

29. The method of claim 2, wherein:
in accordance with a determination that the sensory type is light touch, pressure, vibration, or temperature, selecting the changes to configuration parameters is further based on determining whether the first virtual sensory location is deformed by more than a predetermined amount in a specified time interval.

30. The method of claim 1, wherein each virtual sense property location is a point, a one-dimensional segment, a two-dimensional area, or a three-dimensional region.

* * * * *